United States Patent
Arai

(10) Patent No.: US 9,415,684 B2
(45) Date of Patent: Aug. 16, 2016

(54) CONTROL DEVICE AND CONTROL METHOD FOR FOUR-WHEEL DRIVE VEHICLE

(71) Applicant: TOYOTA JIDOSHA KABUSHIKI KAISHA, Toyota (JP)

(72) Inventor: Masayuki Arai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/496,407

(22) Filed: Sep. 25, 2014

(65) Prior Publication Data

US 2015/0096821 A1  Apr. 9, 2015

(30) Foreign Application Priority Data

Oct. 4, 2013 (JP) ................................ 2013-209666

(51) Int. Cl.
*B60K 23/08* (2006.01)
*B60W 30/18* (2012.01)
(Continued)

(52) U.S. Cl.
CPC ............ *B60K 23/0808* (2013.01); *B60K 17/02* (2013.01); *B60W 30/18072* (2013.01); *B60K 17/35* (2013.01); *B60K 2023/0858* (2013.01); *B60W 2030/1809* (2013.01)

(58) Field of Classification Search
CPC ............. B60K 23/0808; B60K 17/02; B60W 30/18072; B60K 2023/0858; B60W 2030/1809
USPC .................... 74/655 F, 11; 475/198; 180/247; 192/85 R
See application file for complete search history.

(56) References Cited

U.S. PATENT DOCUMENTS

| | | | |
|---|---|---|---|
| 7,497,285 B1 * | 3/2009 | Radev ...................... | B60K 6/26 180/65.225 |
| 2005/0029035 A1 * | 2/2005 | Shigeta .............. | B60K 23/0808 180/248 |

(Continued)

FOREIGN PATENT DOCUMENTS

| | | |
|---|---|---|
| JP | 64-16432 | 1/1989 |
| JP | 2002-227885 | 8/2002 |

(Continued)

OTHER PUBLICATIONS

Office Action issued Sep. 29, 2015 in Japanese Patent Application No. 2013-209666 (submitting partial English translation only).

*Primary Examiner* — Jacob Knutson
(74) *Attorney, Agent, or Firm* — Oblon, McClelland, Maier & Neustadt, L.L.P.

(57) ABSTRACT

A four-wheel drive vehicle includes an engine, a transmission provided on a power transmission path between a main drive wheel and a subsidiary drive wheel, and a connection-disconnection mechanism provided on a power transmission path between the transmission and the subsidiary drive wheel to selectively connect and disconnect the power transmission path. A control device for the four-wheel drive vehicle includes an electronic control unit. The electronic control unit is configured to control a transmission torque of the transmission to be less than or equal to a predetermined value when a predetermined condition is satisfied during traveling, and to control the connection-disconnection mechanism so as to at least partially overlap a time during which the transmission torque of the transmission is controlled to be less than or equal to the predetermined value and a time during which the power transmission path is disconnected by the connection-disconnection mechanism.

9 Claims, 7 Drawing Sheets

(51) Int. Cl.
  *B60K 17/02* (2006.01)
  *B60K 17/35* (2006.01)

(56) References Cited

U.S. PATENT DOCUMENTS

2011/0275470 A1* 11/2011 Ekonen .................. B60K 17/35
    475/198
2013/0226421 A1* 8/2013 Horaguchi ........... B60K 17/344
    701/67

FOREIGN PATENT DOCUMENTS

| JP | 2009-166706 | 7/2009 |
| JP | 2011-255846 | 12/2011 |
| JP | 2012-047148 | 3/2012 |
| JP | 2012-061923 | 3/2012 |
| JP | 2012-218689 A | 11/2012 |
| JP | 2013-116697 A | 6/2013 |
| WO | WO 2013/038446 A1 | 3/2013 |

* cited by examiner

FIG. 2

|  | FIRST CLUTCH | SECOND CLUTCH | COUPLING |
|---|---|---|---|
| 2WD_d (2WD DISCONNECTION STATE) | OFF | OFF | OFF |
| 2WD (4WD STANDBY STATE) | ON | ON | OFF |
| 4WD | ON | ON | ON |

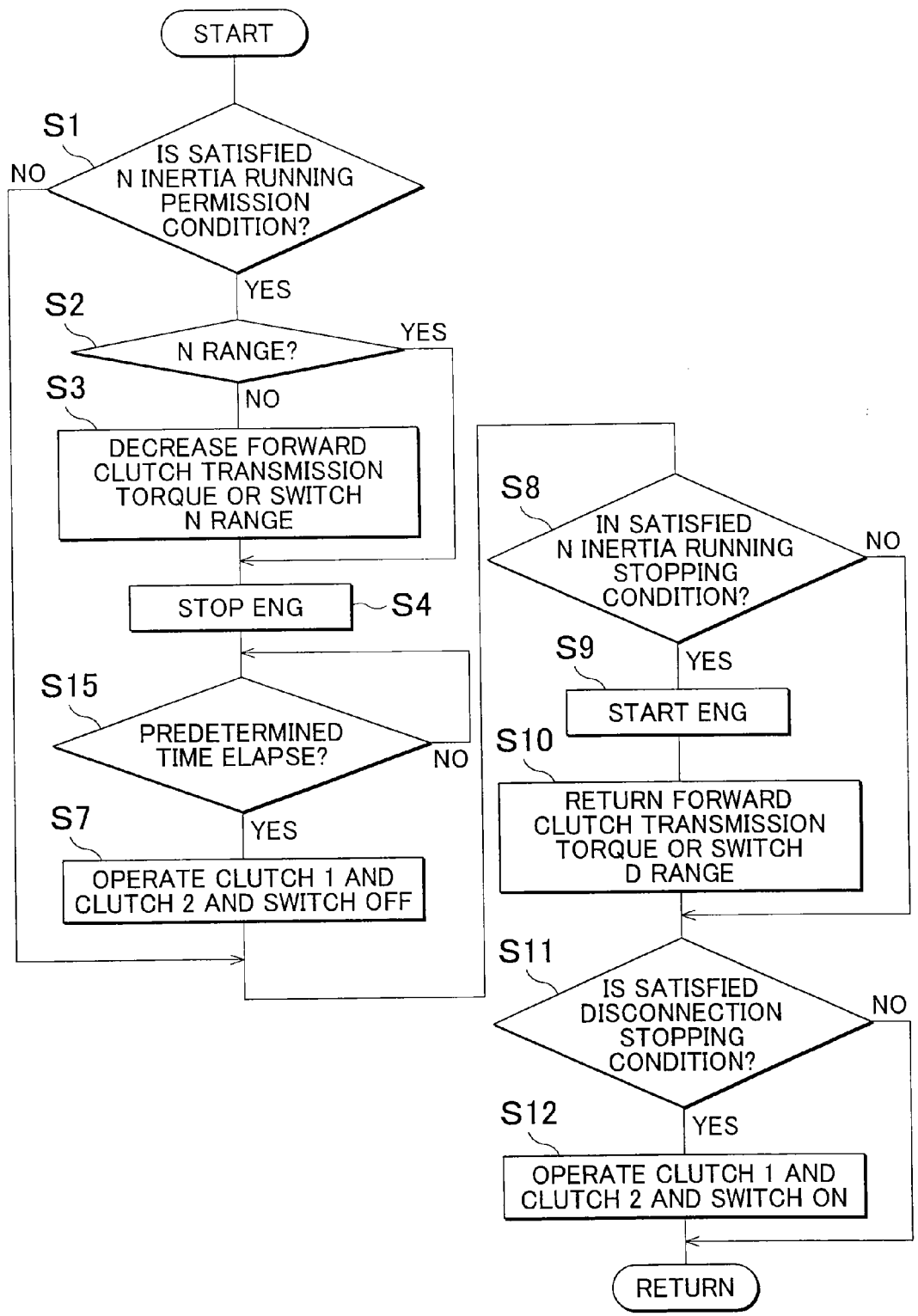

CONTROL DEVICE AND CONTROL METHOD FOR FOUR-WHEEL DRIVE VEHICLE

INCORPORATION BY REFERENCE

The disclosure of Japanese Patent Application No. 2013-209666 filed on Oct. 4, 2013 including the specification, drawings and abstract is incorporated herein by reference in its entirety.

BACKGROUND OF THE INVENTION

1. Field of the Invention

The present invention relates to a control device and a control method for a four-wheel drive vehicle. Particularly, the present invention relates to a control device and a control method of a four-wheel drive vehicle including transmissions provided on a power transmission path between an engine and a main drive wheel and a power transmission path between the engine and a subsidiary drive wheel, and a connection-disconnection mechanism which is provided on the power transmission path between the transmission and the subsidiary drive wheel and selectively connects and disconnects the power transmission path.

2. Description of Related Art

A vehicle is known, which performs inertia traveling in a state where a transmission provided between an engine and a drive wheel is set to be neutral, that is, performs so-called neutral inertia traveling when a predetermined condition is satisfied during the traveling of the vehicle. As an example, there is a control device of a vehicle disclosed in Japanese Patent Application Publication No. 2012-47148 (JP 2012-47148 A). In the vehicle disclosed in JP 2012-47148 A, when a predetermined condition is satisfied, a clutch provided in a transmission is disconnected while an engine is stopped, and thus, the vehicle travels by inertia. In the neutral inertia traveling, traveling resistance is decreased by disconnecting a power transmission path between the engine and the drive wheel, and re-acceleration timing is delayed by stepping on an accelerator according to the deceleration of the vehicle. Accordingly, fuel efficiency is improved.

SUMMARY OF THE INVENTION

In the vehicle disclosed in JP 2012-47148 A, in the neutral inertia traveling, a rotating element configuring the power transmission path between the transmission and the drive wheel is also rotated. In this way, the rotating element is rotated together, which acts as the traveling resistance of the vehicle, and thus, from the viewpoint of improvement in fuel efficiency, there is still room for further improvement. For example, as described in Japanese Patent Application Publication No. 64-16432 (JP 64-16432 A), when the neutral inertia traveling is applied to a four-wheel drive automatic transmission, even when the automatic transmission is controlled to be in a neutral state, the rotating element positioned at the downstream side of a transfer is still rotated together. Accordingly, the rotating element agitates a lubricating oil, or the like, which acts as the traveling resistance of the vehicle.

The present invention provides a control device and a control method capable of further decreasing traveling resistance and improving fuel efficiency while transmission torque of a transmission is controlled to be less than or equal to a predetermined value in a control device of a four-wheel drive vehicle in which the transmission torque of the transmission is controlled to be less than or equal to a predetermined value when a predetermined condition is satisfied during the traveling of a vehicle.

A first aspect of the present invention is a control device for a four-wheel drive vehicle, the four-wheel drive vehicle including an engine, a transmission provided on a power transmission path between a main drive wheel and a subsidiary drive wheel, and a connection-disconnection mechanism provided on a power transmission path between the transmission and the subsidiary drive wheel to selectively connect and disconnect the power transmission path between the transmission and the subsidiary drive wheel. The control device includes an electronic control unit. The electronic control unit is configured to control a transmission torque of the transmission to be less than or equal to a predetermined value when a predetermined condition is satisfied during traveling. The electronic control unit is configured to control the connection-disconnection mechanism so as to at least partially overlap a time during which the transmission torque of the transmission is controlled to be less than or equal to the predetermined value and a time during which the power transmission path is disconnected by the connection-disconnection mechanism.

According to the aspect, the transmission torque of the transmission is controlled to be less than or equal to the predetermined value when the predetermined condition is satisfied during the traveling. However, the power transmission path between the transmission and the subsidiary drive wheel is disconnected by the connection-disconnection mechanism during the control, and thus, co-rotation of rotating elements configuring the power transmission path between the transmission and the connection-disconnection mechanism is prevented. Accordingly, since a rotation resistance generated by the co-rotation of the rotating elements is also decreased and a traveling resistance is also decreased, a timing of a stepping operation of an accelerator pedal during deceleration is delayed compared to when the co-rotation of the rotating elements is generated, and thus, fuel efficiency can be further improved.

In the aspect, the electronic control unit may be configured to change a condition permitting the disconnection of the connection-disconnection mechanism so as to be alleviated while the transmission torque of the transmission is controlled to be less than or equal to the predetermined value, compared to when the transmission torque of the transmission is controlled to be greater than the predetermined value. According to this aspect, compared to when the transmission torque is not set to be less than or equal to the predetermined value, the connection-disconnection mechanism is easily disconnected while the transmission torque of the transmission is controlled to be less than or equal to the predetermined value. Accordingly, the connection-disconnection mechanism is disconnected while the transmission torque is controlled to be less than or equal to the predetermined value, the co-rotation of the rotating elements configuring the power transmission path between the transmission and the connection-disconnection mechanism is prevented, and the traveling resistance can be decreased.

In the aspect, the condition may include at least one of a friction coefficient on a road surface, a slip amount of a drive wheel, slip history of the drive wheel, a steering angle, a fluctuation ratio of engine torque, and a fluctuation ratio of a vehicle speed.

According to this aspect, by appropriately changing the determined values with respect to the conditions while the traveling is performed at the transmission torque of the transmission less than or equal to the predetermined value, the connection-disconnection mechanism can be easily changed to the side in which the connection-disconnection mechanism is easily disconnected (compared to when the transmission torque of the transmission is not set to be less than or equal to the predetermined value, alleviating the condition permitting the disconnection of the connection-disconnection mechanism can be easily changed).

In the aspect, the predetermined condition may include the condition permitting the interruption of the connection-disconnection mechanism. According to this aspect, when the transmission torque of the transmission is controlled to be less than or equal to the predetermined value, the connection-disconnection mechanism is disconnected, the co-rotation of the rotating elements configuring the power transmission path between the transmission and the connection-disconnection mechanism is prevented, and the traveling resistance can be decreased.

In the aspect, the predetermined condition may include at least one of an accelerator opening, a friction coefficient on a road surface, a slip amount of a drive wheel, a slip ratio of a drive wheel, slip history of a drive wheel, a steering angle, a fluctuation ratio of engine torque, and a fluctuation ratio of a vehicle speed. According to this aspect, since any of the conditions is also included in the condition permitting the disconnection of the connection-disconnection mechanism, when the transmission torque of the transmission is controlled to be less than or equal to the predetermined value, the connection-disconnection mechanism is disconnected, and the co-rotation of the rotating elements is prevented.

In the aspect, the electronic control unit may be configured to disconnect the connection-disconnection mechanism at any one time of at the same time when the condition is satisfied and the time after a predetermined time elapses from when the condition is satisfied. According to this aspect, since the connection-disconnection mechanism is disconnected at the same time when the condition permitting the connection and disconnection of the connection-disconnection mechanism is satisfied or after the predetermined time elapses, the disconnection of the connection-disconnection mechanism is performed at the same time when the condition is satisfied, or after the predetermined time elapses and the vehicle is stabilized.

In the aspect, the electronic control unit may be configured to change the predetermined time based on at least one of an oil temperature of a hydraulic oil of the transmission, an oil temperature of the engine, a coolant temperature of the engine, an outside air temperature, a traveling distance from a traveling start point, and a traveling time. According to this aspect, an optimal predetermined time is set based on any of the above conditions.

In the aspect, the electronic control unit may be configured to stop the engine while the transmission torque of the transmission is controlled to be less than or equal to the predetermined value. According to this aspect, the engine is also stopped while the transmission torque of the transmission is controlled to be less than or equal to the predetermined value, and thus, fuel efficiency is further improved.

In the aspect, the four-wheel drive vehicle may further include a switching mechanism configured to selectively switch a power transmission to the subsidiary drive wheel on a power transmission path between the transmission and the connection-disconnection mechanism. According to this aspect, since the power transmission to the subsidiary drive wheel is disconnected by the switching mechanism along with the disconnection of the connection-disconnection mechanism, the co-rotation of the rotating elements configuring the power transmission path between the switching mechanism and the connection-disconnection mechanism can be securely prevented. In the aspect, the electronic control unit may be configured to disconnect the switching mechanism when the power transmission path is disconnected by the connection-disconnection mechanism. A second aspect of the present invention is a control method for a four-wheel drive vehicle, the four-wheel drive vehicle including an engine, a transmission provided on a power transmission path between a main drive wheel and a subsidiary drive wheel, a connection-disconnection mechanism provided on a power transmission path between the transmission and the subsidiary drive wheel to selectively connect and disconnect the power transmission path between the transmission and the subsidiary drive wheel, and an electronic control unit. The control method includes: controlling, by the electronic control unit, a transmission torque of the transmission to be less than or equal to a predetermined value when a predetermined condition is satisfied during traveling; and controlling, by the electronic control unit, the connection-disconnection mechanism so as to at least partially overlap a time during which the transmission torque of the transmission is controlled to be less than or equal to the predetermined value and a time during which the power transmission path is disconnected by the connection-disconnection mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an engagement operation table illustrating an engagement state among a first clutch, a second clutch, and a coupling corresponding to each traveling mode described below in the four-wheel drive vehicle of FIG. 1;

FIG. 7 is a flowchart illustrating the main portion of the control operation of the electronic control unit of FIG. 5.

DETAILED DESCRIPTION OF EMBODIMENTS

Hereinafter, an embodiment of the present invention will be described in detail with reference to the drawings. In the following drawings, the drawings are appropriately simplified or changed, and a dimension ratio, a shape, or the like of each portion is not necessarily drawn correctly.

Figure 1:
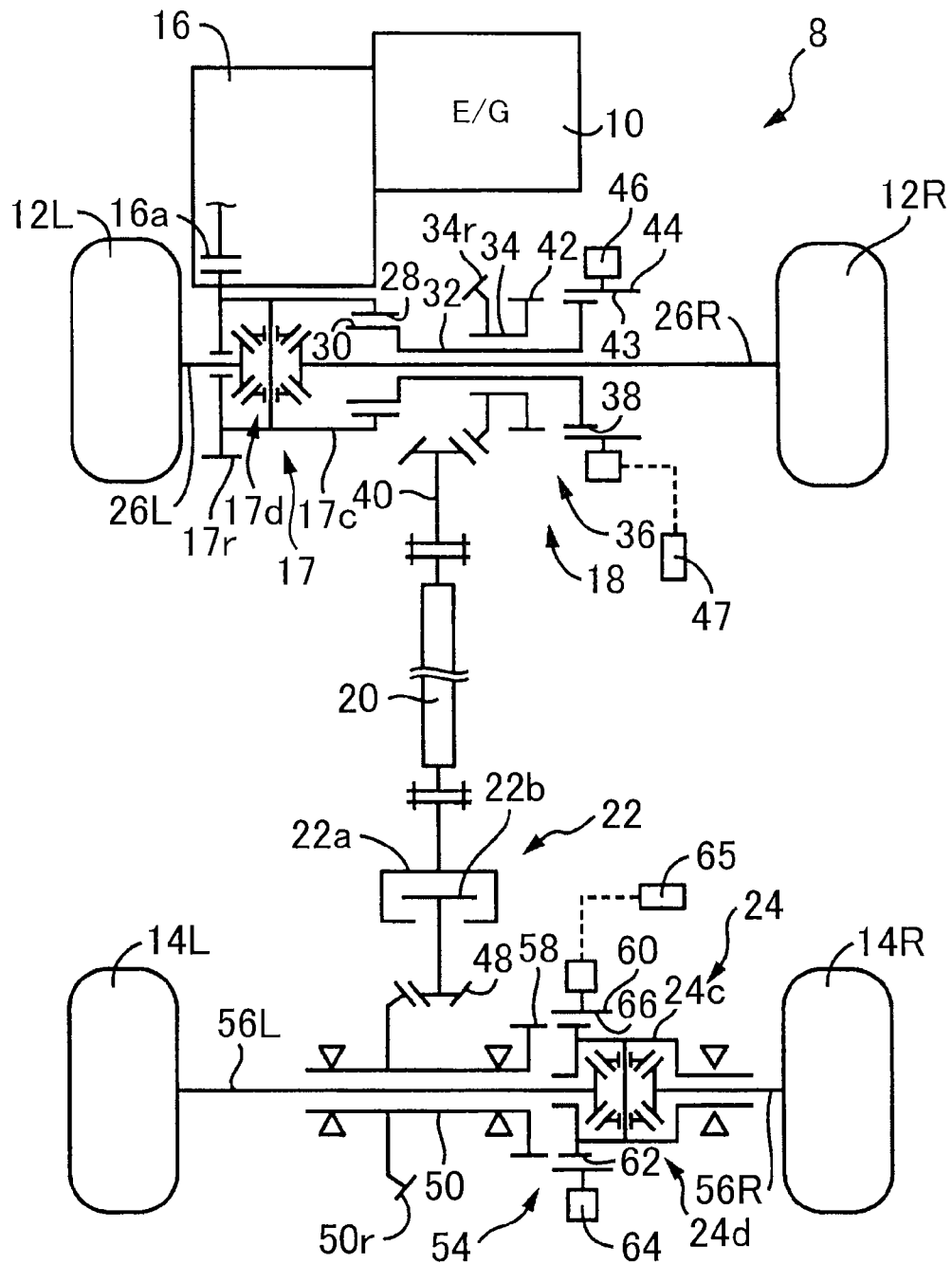
FIG. 1 is a substantial diagram schematically illustrating a configuration of a four-wheel drive vehicle to which the present invention is appropriately applied.

FIG. 1 is a substantial diagram schematically illustrating a configuration of a four-wheel drive vehicle 8 (hereinafter, referred to as a vehicle 8) to which the present invention is appropriately applied. In FIG. 1, the vehicle 8 has an engine 10 as the driving source. The vehicle 8 includes a power transmission path through which power of the engine 10 is transmitted to front wheels 12L, 12R (when the front wheels are not particularly distinguished from each other, the front wheels are referred to as a front wheel 12), and a power transmission path through which the power of the engine 10 is transmitted to rear wheels 14L, 14R (when the rear wheels are not particularly distinguished from each other, the rear wheels are referred to as a rear wheel 14). The vehicle 8 is an FF-base vehicle. The vehicle 8 is configured to include an automatic transmission 16, a front differential 17, a transfer 18, a propeller shaft 20, a coupling 22, and a rear differential 24. Although it is not shown in FIG. 1, a torque converter which is a hydraulic power transmission is provided between the engine 10 and the automatic transmission 16. The front wheel 12 is an example of a main drive wheel of the present invention. The rear wheel 14 is an example of a subsidiary drive wheel of the present invention. The automatic transmission 16 is an example of the transmission of the present invention.

The automatic transmission 16 is provided on the power transmission path between the engine 10 and the front wheel 12, and the power transmission path between the engine 10 and the rear wheel 14. For example, the automatic transmission 16 includes a plurality of planetary gears and a plurality of friction engagement devices (clutch, brake), and is a stepped automatic transmission which is shifted to a plurality of shifting stages by clamping the plurality of friction engagement devices. Since the automatic transmission 16 is a well-known technology, descriptions with respect to the specific structure or the operation of the automatic transmission are omitted.

The front differential 17 (front differential gear) is configured to include a case 17c and a differential mechanism 17d including bevel gears. The front differential 17 transmits rotation while applying differential rotation to right and left axles 26L, 26R of the front wheels 12. A ring gear 17r is formed in the case 17c of the front differential 17. The ring gear 17r is in mesh with an output gear 16a which is an output rotation member of the automatic transmission 16. Accordingly, the power output from the automatic transmission 16 is input to the ring gear 17r. An inner circumferential fitting gear 28, which is fitted to an outer circumferential fitting gear 30 of a first rotation member 32 described below, is formed on the case 17c of the front differential 17. Since the front differential 17 is a well-known technology, descriptions with respect to the specific structure or the operation of the front differential are omitted.

The transfer 18 is provided to be arranged with the front differential 17 in the vehicle width direction. The transfer 18 is configured to include the first rotation member 32 on which the outer circumferential fitting gear 30 is formed, a second rotation member 34 on which the ring gear 34r for transmitting power to the rear wheel 14 side is formed, and a first clutch 36 including a claw clutch which selectively connects and disconnects the first rotation member 32 and the second rotation member 34.

The first rotation member 32 has a cylindrical shape, and the axle 26R penetrates the inner circumferential side of the first rotation member 32. The outer circumferential fitting gear 30 is formed on one side in the axial direction of the first rotation member 32. The outer circumferential fitting gear 30 is fitted to the inner circumferential fitting gear 28 formed in the case 17c, and thus, the first rotation member 32 is integrally rotated with the case 17c of the front differential 17. Clutch teeth 38 that configure the first clutch 36 are formed on the other side in the axial direction of the first rotation member 32.

The second rotation member 34 has a cylindrical shape, and the axle 26R and the first rotation member 32 penetrate the inner circumferential side of the second rotation member 34. The ring gear 34r meshing with a driven pinion 40 is formed on one side in the axial direction of the second rotation member 34. Clutch teeth 42 that configure the first clutch 36 are formed on the other side in the axial direction of the second rotation member 34. The driven pinion 40 is connected to one rotating element 22a of the coupling 22 via the propeller shaft 20.

The first clutch 36 is provided on a power transmission path between the automatic transmission 16 and a second clutch 54. Specifically, the first clutch 36 is provided in the transfer 18 which selectively switches the power transmission to the rear wheel 14. The first clutch 36 is a claw clutch which selectively connects and disconnects between the first rotation member 32 and the second rotation member 34. The first clutch 36 is a claw clutch which is configured to include the clutch teeth 38 of the first rotation member 32, the clutch teeth 42 of the second rotation member 34, a sleeve 44 on which inner circumferential teeth 43 capable of meshing with the clutch teeth 38 and the clutch teeth 42 are formed, and a shift fork 46 which drives the sleeve 44 in the axial direction. For example, the shift fork 46 is driven by a first actuator 47 which is electrically controlled. The first clutch 36 is an example of a switching mechanism of the present invention.

FIG. 1 shows a state where the first clutch 36 is disconnected. At this time, since the connection between the first rotation member 32 and the second rotation member 34 is disconnected, the power transmission path between the automatic transmission 16 and the rear wheel 14 is disconnected, and thus, the power is not transmitted to the rear wheel 14. Meanwhile, in FIG. 1, when the sleeve 44 is moved to the front wheel 12L side and the clutch teeth 38 and the clutch teeth 42 mesh with the inner circumferential teeth 43 of the sleeve 44, the first clutch 36 is connected. Accordingly, the first rotation member 32 and the second rotation member 34 are connected to each other. Therefore, when the first rotation member 32 is rotated, the second rotation member 34, the driven pinion 40, the propeller shaft 20, and the one rotating element 22a of the coupling 22 are rotated together.

The coupling 22 is provided between the propeller shaft 20 and the rear differential 24. The coupling 22 is configured to transmit torque between one rotating element 22a and the other rotating element 22b. For example, the coupling 22 is an electronic control coupling which is configured of a multi-plate wet clutch. The transmission torque of the coupling 22 is controlled, and thus, the coupling 22 is configured so that torque distribution of the front and rear wheels can be continuously changed between 100:0 to 50:50. Specifically, when a current is supplied to an electromagnetic solenoid (not shown) controlling the transmission torque of the coupling 22, the coupling 22 is engaged by engaging force proportional to the current value. For example, when a current is not supplied to the electronic solenoid, the engaging force of the coupling 22 becomes zero, that is, the transmission torque becomes zero. Accordingly, the torque distribution of the front and rear wheels becomes 100:0. When the current of the electromagnetic solenoid is increased and the coupling 22 is completely engaged, the torque distribution of the front and rear wheels becomes 50:50. In this way, the torque distribution transmitted to the rear wheel side is increased as the current value supplied to the electromagnetic solenoid is increased. The torque distribution of the front and rear wheels can be continuously changed by controlling the current value. Since the coupling 22 is a known technology, descriptions of the specific structure or the operation are omitted.

The other rotating element 22b of the coupling 22 is connected to the drive pinion 48. The drive pinion 48 meshes with a ring gear 50r which is formed on a third rotation member 50 described below.

The third rotation member 50 has a cylindrical shape, and an axle 56L penetrates the inner circumferential side of the third rotation member 50. The ring gear 50r meshing with the drive pinion 48 is formed on one side in the axial direction of the third rotation member 50. Clutch teeth 58 that configure the second clutch 54 described below are formed on the other side in the axial direction of the third rotation member 50.

The rear differential 24 is configured to include a case 24c and a differential mechanism 24d which is configured of bevel gears. Since the rear differential 24 is a well-known technology, descriptions with respect to the specific structure or the operation of the rear differential are omitted. Clutch teeth 62 that configures the second clutch 54 described below are formed on the case 24c of the rear differential 24.

The second clutch 54 is provided on a power transmission path between the automatic transmission 16 and the rear wheel 14. The second clutch 54 is a claw clutch for selectively connecting and disconnecting the power transmission path between the automatic transmission 16 and the rear wheel 14. Specifically, the second clutch 54 is a claw clutch for selectively connecting and disconnecting between the third rotation member 50 and the rear differential 24. The second clutch 54 is configured to include the clutch teeth 58, the clutch teeth 62, a sleeve 60 having a cylindrical shape, and a shift fork 64 which drives the sleeve 60 in the axial direction. For example, the shift fork 64 is driven by a second actuator 65 which is electrically controlled. Inner circumferential teeth 66 capable of meshing with the clutch teeth 58 and the clutch teeth 62 are formed on the inner circumferential side of the sleeve 60. The position of the sleeve 60 is controlled by the second actuator 65, and thus, the engagement state between the clutch teeth 58, 62 and the inner circumferential teeth 66 of the sleeve 60 is switched.

FIG. 1 shows a state where the second clutch 54 is disconnected. At this time, the connection between the third rotation member 50 and the rear differential 24 is disconnected. That is, the power transmission path between the propeller shaft 20 and the rear wheel 14 is disconnected. Meanwhile, in FIG. 1, when the sleeve 60 is moved to the rear wheel 14L side by the second actuator 65 and the clutch teeth 58 and the clutch teeth 62 mesh with the inner circumferential teeth 66 of the sleeve 60, the third rotation member 50 and the rear differential 24 are connected to each other. The second clutch 54 is an example of a connection-disconnection mechanism of the present invention.

FIG. 2 is an engagement operation table illustrating an engagement state among the first clutch 36, the second clutch 54, and the coupling 22 corresponding to each traveling mode described below in the vehicle 8. In FIG. 2, in 2WD_d traveling (2WD disconnection state), the first clutch 36, the second clutch 54, and the coupling 22 are disconnected. Accordingly, since the connection of the first clutch 36 is disconnected while the power from the engine 10 is transmitted to the front wheel 12 via the automatic transmission 16 and the front differential 17, the power from the engine 10 is not transmitted to the second rotation member 34. That is, the power transmission path between the engine 10 and the front wheel 12 becomes a power transmission state. On the other hand, the power transmission path between the engine 10 and the rear wheel 14 is disconnected.

The first clutch 36 and the second clutch 54 are disconnected by each other, and thus, the power transmission with respect to each rotating element (second rotation member 34, driven pinion 40, propeller shaft 20, coupling 22, drive pinion 48, third rotation member 50) that configures the power transmission path between the second rotation member 34 and the third rotation member 50 is disconnected. The rotations of the rotating elements are stopped during traveling, and thus, co-rotation of the rotating element is prevented. In this way, since the co-rotation of rotating elements is decreased, the traveling resistance during the 2WD-d traveling is further decreased. The switching (particularly, disconnection of the second clutch 54) to the 2WD_d traveling is an example of the disconnection in the connection-disconnection mechanism of the present invention.

In 2WD traveling (4WD standby state) shown in FIG. 2, the coupling 22 is disconnected while the first clutch 36 and the second clutch 54 are connected to each other. Accordingly, the coupling 22 is disconnected while the power from the engine 10 is transmitted to the front wheel 12 via the automatic transmission 16 and the front differential 17, and thus, the power is not transmitted to the rear wheel 14. That is, the power transmission path between the engine 10 and the rear wheel 14 is disconnected while the power transmission path between the engine 10 and the front wheel 12 becomes in a power transmission state.

Since the first clutch 36 is connected, when the first rotation member 32 is rotated, the second rotation member 34, the driven pinion 40, the propeller shaft 20, and the one rotating element 22a of the coupling 22 are rotated together. Since the second clutch 54 is connected, when the rear wheel 14 is rotated, the rear differential 24, the third rotation member 50, the drive pinion 48, and the other rotating element 22b of the coupling 22 are rotated together. In this way, since the first clutch 36 and the second clutch 54 are connected to each other, the rotating elements are rotated together, and the rotating elements act as traveling resistances which agitate lubricating oil or the like. Therefore, since a timing of stepping on an accelerator pedal is made earlier during the deceleration, the fuel efficiency is decreased compared to the above-described 2WD_d traveling. However, when the switching is performed from the 2WD traveling to the 4WD traveling, only the coupling 22 is connected. Accordingly, speedy switching to the 4WD traveling can be realized.

In the 4WD traveling, the first clutch 36, the second clutch 54, and the coupling 22 are connected to one another. Accordingly, the power of the engine 10 is transmitted to the front wheel 12 via the automatic transmission 16 and the front differential 17, and a portion of the power of the engine 10 is transmitted to the rear wheel 14 via the propeller shaft 20, the coupling 22, the rear differential 24, or the like. That is, the power transmission path between the engine 10 and the front wheel 12 can transmit the power, and the power transmission path between the engine 10 and the rear wheel 14 can transmit the power. In the 4WD traveling, the transmission torque of the coupling 22 is controlled, and thus, the torque distribution of the front and rear wheels is appropriately adjusted.

Figure 3:
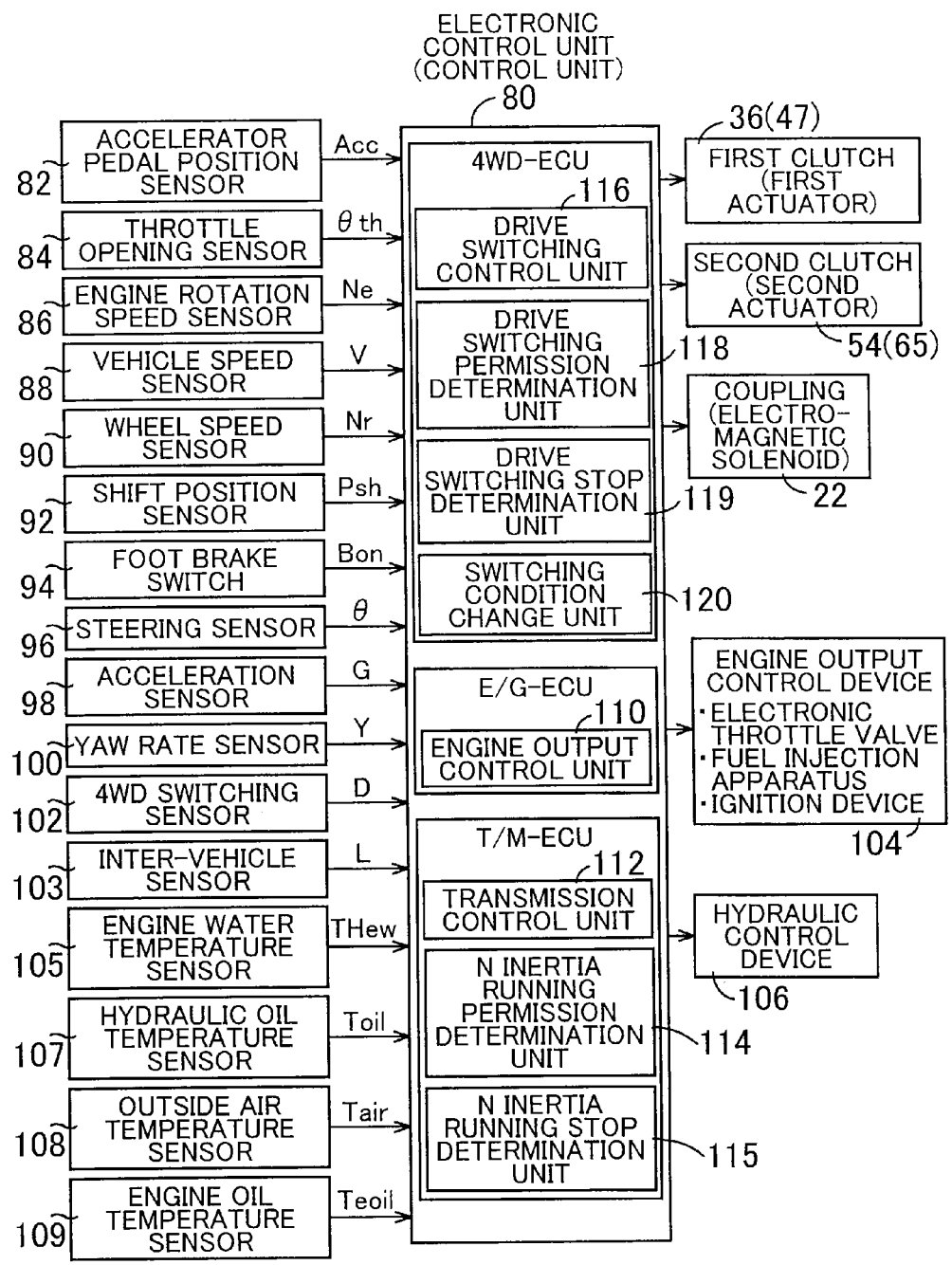
FIG. 3 is a functional block diagram which illustrates a control system of an electronic control unit controlling the four-wheel drive vehicle of FIG. 1 and illustrates a main portion of a control function according to switching of a front wheel drive and a rear wheel drive described below.

FIG. 3 is a functional block diagram which illustrates a control system of an electronic control unit 80 controlling the vehicle 8 and illustrates a main portion of a control function according to switching of the front wheel drive and the rear wheel drive described below. For example, the electronic control unit 80 is configured to include a so-called microcomputer having a CPU, a RAM, a ROM, an input-output interface, or the like. The CPU performs various controls of the vehicle 8 by carrying out signal processing according to programs stored in the ROM in advance while using a temporary storage function of the RAM. For example, the electronic control unit 80 performs an output control of the engine 10, a transmission control of the automatic transmission 16, connection-disconnection controls of the first clutch 36 and the second clutch 54, a torque capacity control of the coupling 22, or the like. The electronic control unit 80 of the present embodiment may be configured of a plurality of control devices such as an E/G ECU controlling the output of the engine 10, a 4WD-ECU controlling the driving states of the front and rear wheels, a T/M-ECU controlling the shifting state of the automatic transmission 16, or the like, and may be configured of one control device.

As shown in FIG. 3, a signal indicating an accelerator opening Acc corresponding to an operation amount of the accelerator pedal detected by an accelerator opening sensor 82, a signal indicating a throttle opening θth of an electronic throttle valve detected by a throttle opening sensor 84, a signal indicating an engine rotation speed Ne detected by an engine rotation speed sensor 86, a signal indicating a vehicle speed V corresponding to a rotation speed Nout of the output shaft of the automatic transmission 16 detected by a vehicle speed sensor 88, a signal indicating Nr which is a rotation speed of each wheel detected by the wheel speed sensor 90, a signal indicating a shift position (operation position) Psh of a shift lever detected by a shift position sensor 92, a signal indicating the operation state of a foot brake detected by the foot brake switch 94, a signal indicating a steering angle θ detected by a steering sensor 96, a signal indicating a vehicle longitudinal acceleration G detected by an acceleration sensor 98, a signal indicating a yaw rate Y (yaw angle) detected by a yaw rate sensor 100, a signal indicating a traveling mode of the vehicle 8 detected by a 4WD switching switch 102, a signal indicating an inter-vehicle distance L between a preceding vehicle and a vehicle detected by an inter-vehicle sensor 103, a signal indicating an engine coolant temperature THew of an engine cooling water detected by an engine coolant temperature sensor 105, a signal indicating an oil temperature Toil of a hydraulic oil of the automatic transmission 16 detected by a hydraulic oil temperature sensor 107, a signal indicating an outside air temperature Tair detected by an outside air temperature sensor 108, a signal indicating an oil temperature Teoil of an engine oil detected by an engine oil temperature sensor 109, or the like are supplied to the electronic control unit 80.

An engine output control command signal for controlling the output of the engine 10 is supplied from the electronic control unit 80 to the engine output control device 104. Specifically, a throttle valve opening signal which drives a throttle actuator to control the throttle valve opening θth of the electronic throttle valve, an injection signal for controlling an amount of the fuel injected from a fuel injection apparatus, an ignition timing signal for controlling an ignition timing of the engine 10 by an ignition device, and the like are output from the electronic control unit 80. A shifting command signal to a hydraulic control device 106 controlling the shifting state of the automatic transmission 16 is output from the electronic control unit 80. An operation signal of a first actuator 47 switching the connection and disconnection of the first clutch 36, an operation signal of a second actuator 65 switching the connection and disconnection of the second clutch 54, a transmission torque signal to an electromagnetic solenoid (not shown) controlling the transmission torque of the coupling 22, and the like are output from the electronic control unit 80.

In the vehicle 8 configured as described above, when a predetermined condition is satisfied during traveling, the electronic control unit 80 performs a so-called neutral inertia traveling (hereinafter, referred to as an N inertia running) in which the automatic transmission 16 is controlled to be in a neutral state or the transmission torque is controlled to be less than or more than a predetermined value, and inertia traveling is performed. When the N inertia running is performed, the traveling resistance is decreased compared to engine brake traveling. Accordingly, a driver can delay a timing when the driver steps on the accelerator pedal during the inertia traveling. As a result, fuel efficiency is improved. However, in the vehicle 8, even when the automatic transmission 16 is controlled to be in the neutral state or the transmission torque is controlled to be less than or equal to the predetermined value, if the first clutch 36 and the second clutch 54 are connected to each other, the rotating elements from the automatic transmission 16 to the rear wheel 14 are rotated together. When the rotating elements are rotated together and the lubricating oil is agitated, this acts as the traveling resistance, and thus, sufficient effects in improvement of the fuel efficiency cannot be obtained. Accordingly, there is room for further improvement. Therefore, when the inertia traveling is performed in the state where the automatic transmission 16 is controlled to be in the neutral state or the transmission torque is controlled to be less than or equal to the predetermined value, the electronic control unit 80 selects an optimal traveling mode, and thus, the traveling resistance during the inertia traveling is further decreased, and the fuel efficiency is further improved. Hereinafter, the control operation of the electronic control unit 80 according to the present invention will be described in detail.

The electronic control unit 80 is configured to functionally include an engine output control unit 110, a transmission control unit 112, an N inertia running permission determination unit 114, an N inertia running stop determination unit 115, a drive switching control unit 116, a drive switching permission determination unit 118, a drive switching stop determination unit 119, and a switching condition change unit 120. In FIG. 3, the 4WD-ECU is configured to functionally include the drive switching control unit 116, the drive switching permission determination unit 118, the drive switching stop determination unit 119, and the switching condition change unit 120, the E/G-ECU is configured to functionally include the engine output control unit 110, and the T/M-ECU is configured to functionally include the transmission control unit 112, the N inertia running permission determination unit 114, and the N inertia running stop determination unit 115. The ECUs are not necessarily limited to those including the functions.

The engine output control unit 110 calculates a required driving force Tr based on an actual accelerator opening Acc (or throttle opening θth) and an actual vehicle speed V from a driving force map in which, for example, the accelerator opening Acc (or throttle opening θth) and the vehicle speed V which are obtained in advance and stored are set as variables. A shift ratio or the like of the automatic transmission 16 is further taken into consideration in the calculated required driving force Tr, and thus, the engine torque Te to be output by the engine 10 is calculated. The engine output control unit 110 outputs a command signal with respect to the engine output control device 104 to obtain the calculated engine torque Te.

When the shift position Psh is a D position which is a forward traveling position, for example, the transmission control unit 112 determines a shifting stage to be shifted based on the actual accelerator opening Acc (or throttle opening θth) and the actual vehicle speed V from a shift map in which, for example, the accelerator opening Acc (or throttle opening θth) and the vehicle speed V which are obtained in advance and stored are set as variables. The transmission control unit outputs a command which shifts the determined shifting stage to the hydraulic control device 106.

When the predetermined condition is satisfied, the transmission control unit 112 performs a so-called N inertia running in which the vehicle 8 is inertia-travelled in the state where the automatic transmission 16 is controlled to be in the neutral state or the transmission torque is controlled to be less than or equal to the predetermined value. Here, whether or not the predetermined condition, in which the switching to the N inertia running is permitted, is determined by the N inertia running permission determination unit 114. For example, the N inertia running permission determination unit 114 determines whether or not the switching to the N inertia running is permitted based on whether or not a plurality of permission conditions of the N inertia running switching described below are satisfied. That is, each permission condition described below is an example of the predetermined condition in which the transmission torque of the transmission of the present invention is controlled to be less than or equal to the predetermined value.

For example, the N inertia running permission determination unit 114 determines whether or not the accelerator opening Acc is less than a predetermined value A1 (Acc<A1). The predetermined value A1 is set in advance based on experimentation or the like. For example, the predetermined value A1 is set to a value in the vicinity of zero at which the required drive of the driver is determined to be approximately zero. When the accelerator opening Acc is less than the predetermined value A1, it is determined that the permission condition of the N inertia running is satisfied.

For example, the N inertia running permission determination unit 114 determines whether or not the vehicle speed V is equal to or more than a predetermined value V1 (V≥V1). The predetermined value V1 is set in advance based on experimentation or the like. The predetermined value V1 is set to a relatively high speed at which the inertia traveling is permitted. When the vehicle speed V is equal to or more than the predetermined value V1, it is determined that the permission condition of the N inertia running is satisfied.

The N inertia running permission determination unit 114 determines whether or not a steering angle θ is less than a predetermined value θ1 (θ<θ1). The predetermined value θ1 is determined in advance based on experimentation or the like. For example, the predetermined value θ1 is set to a low value by which it is determined that the vehicle 8 is stable even when it is switched to the N inertia running. When the steering angle θ is less than the predetermined value θ1, it is determined that the permission condition of the N inertia running is satisfied.

The N inertia running permission determination unit 114 determines whether or not an inter-vehicle distance L between a preceding vehicle and a vehicle is equal to or more than a predetermined value L1 (L≥L1). The predetermined value L1 is determined in advance based on experimentation or the like. For example, the predetermined value L1 is set to a sufficient inter-vehicle distance by which the vehicle does not collide with the preceding vehicle even when the preceding vehicle is suddenly stopped. When the inter-vehicle distance L is equal to or more than the predetermined value L1, it is determined that the permission condition of the N inertia running is satisfied.

The N inertia running permission determination unit 114 determines whether or not a current traveling state is in a traveling state other than the N inertia running (in a traveling state of non-N inertia running). When the current traveling state is in the N inertia running state already, since it is impossible to switch to the N inertia running, whether or not it can be switched to the N inertia running is determined. When the current traveling state is in a traveling state of the non-N inertia running, it is determined that the permission condition of the N inertia running is satisfied.

When the above-described plurality of conditions are satisfied, the N inertia running permission determination unit 114 determines that the switching to the N inertia running is permitted. When it is determined that the switching to the N inertia running is performed, the transmission control unit 112 performs the torque control of the forward clutch of the automatic transmission 16 and controls the torque control to be in the neutral state, or controls the transmission torque to be less than or equal to the predetermined value. The predetermined value is set to a low value at which the automatic transmission 16 is not approximately changed like in the neutral state.

Here, while the automatic transmission 16 is controlled to be in the neutral state or the transmission torque is controlled to be less than or equal to the predetermined value and when the accelerator opening Acc is zero, the engine output control unit 110 stops fuel supply and stops the engine 10. The engine output control unit 110 stops the engine 10 at the same time as the starting of the switching of the transmission control unit 112 to the N inertia running state or after a predetermined time elapses (for example, after the transmission control unit is switched to the neutral state or the transmission torque is controlled to be less than or equal to the predetermined value).

When a condition stopping the N inertia running during the traveling is satisfied in the state where it is switched to the N inertia running, the transmission control unit 112 performs one of switching the automatic transmission 16 to a power transmission range (D range) and returning the magnitude by which normal traveling is possible, and stops the N inertia running. Whether or not the N inertia running is stopped is determined by the N inertia running stop determination unit 115. For example, the N inertia running stop determination unit 115 determines whether or not to stop the N inertia running based on a plurality of N inertia running stop conditions described below.

The N inertia running stop determination unit 115 determines whether or not the current traveling state is in the N inertia running. When the traveling state of the current time point is in the traveling state (non-N inertia running) other than the N inertia running in advance, since the switching from the N inertia running is impossible, it is confirmed whether or not the switching from the N inertia running is possible.

For example, the N inertia running stop determination unit 115 determines whether or not the accelerator opening Acc is equal to or more than a predetermined value A2 (Acc≥A2). The predetermined value A2 is a value which is determined based on experimentation or the like in advance, and for example, is set to a value by which it is determined that the driving force request (acceleration request) of the driver is generated. When the accelerator opening Acc is equal to or more than the predetermined value A2, it is determined that the stop condition of the N inertia running is satisfied.

For example, the N inertia running stop determination unit 115 determines whether or not the vehicle speed V is less than a predetermined value V2 (V<V2). The predetermined value V2 is a value which is determined based on experimentation or the like in advance. For example, the predetermined value V2 is set to a lower limit of the vehicle speed V by which the N inertia running can be performed. When the vehicle speed V is less than the predetermined value V2, it is determined that the stop condition of the N inertia running is satisfied.

For example, the N inertia running stop determination unit 115 determines whether or not the steering angle θ is equal to or more than a predetermined value θ2 (θ≥θ2). The predetermined value θ2 is a value which is determined in advance based on experimentation or the like, and for example, is set to a threshold of a value by which stability of the vehicle 8 is decreased in the N inertia running. When the steering angle θ is equal to or more than the predetermined value θ2, it is determined that the stop condition of the N inertia running is satisfied.

For example, the N inertia running stop determination unit 115 determines whether or not the inter-vehicle distance L between the preceding vehicle and a vehicle is less than a predetermined value L2 (L<L2). The predetermined value L2 is determined in advance based on experimentation or the like. For example, when the preceding vehicle suddenly stops, the predetermined value L2 is set to a threshold value of the inter-vehicle distance by which a collision risk with the preceding vehicle is generated in the N inertia running. When the inter-vehicle distance L is less than the predetermined value L2, it is determined that the stop condition of the N inertia running is satisfied.

When the current traveling state is in the N inertia running state and any of the stop conditions (Acc≥A2, V<V2, θ>θ2, L<L2), by which the N inertia running is stopped with respect to the accelerator opening Acc, the vehicle speed V, the steering angle θ, and the inter-vehicle distance L, is satisfied, the N inertia running stop determination unit 115 determines that the N inertia running is stopped. One of at the same time as when the determination for stopping the N inertia running is performed and after a predetermined time elapses, the transmission control unit 112 starts one of the control for switching the automatic transmission 16 to the power transmission range (D range) and the control for increasing the transmission torque. In parallel with this, when the determination for stopping the N inertia running is performed, the engine output control unit 110 starts the control for starting the engine 10 during the stopping.

When a permission condition (hereinafter, referred to as a disconnection permission condition) which permits the disconnection of the first clutch 36 (switching mechanism) and the second clutch 54 (connection-disconnection mechanism), that is, a permission condition (hereinafter, referred to as a disconnection permission condition) which permits the switching to the 2WD_d traveling is satisfied, the drive switching control unit 116 disconnects the first clutch 36 and the second clutch 54 to be switched to the 2WD_d traveling. Specifically, the drive switching control unit 116 performs a feedback control so that the driving amount of the first actuator 47 controlling the first clutch 36 reaches a target driving amount by which the first clutch 36 is disconnected, and performs a feedback control so that the driving amount of the second actuator 65 controlling the second clutch 54 reaches a target driving amount by which the second clutch 54 is disconnected. When the first clutch 36 and the second clutch 54 are disconnected, the drive switching control unit 116 controls the state so that the 2WD-d traveling state is maintained until the disconnection stop condition described below is satisfied. At this time, the power transmission of the power transmission path between the first clutch 36 and the second clutch 54 is disconnected. Accordingly, the co-rotation of the rotating elements (the second rotation member 34, the driven pinion 40, the propeller shaft 20, the coupling 22, the drive pinion 48, and the third rotation member 50) that configures the power transmission path is prevented. Therefore, the rotating elements do not agitate the lubricating oil, and thus, the traveling resistance is further decreased. The timing when the acceleration request by stepping on the accelerator pedal of the driver is output is also delayed, and thus, the fuel efficiency is further improved.

Here, whether or not the disconnection permission condition for performing the switching to the 2WD_d traveling is satisfied is determined based on the drive switching permission determination unit 118. The drive switching permission determination unit 118 determines whether or not the disconnection permission condition is satisfied based on a plurality of permission conditions described below. The disconnection permission condition is an example of the condition which permits the disconnection of the connection-disconnection mechanism of the present invention.

For example, the drive switching permission determination unit 118 determines that a friction coefficient on a road surface during the traveling is equal to or more than a predetermined value $\mu1$ ($\mu \geq \mu1$). The predetermined value $\mu1$ is determined in advance based on experimentation or the like. The predetermined value $\mu1$ is set to a value by which a possibility that slip is generated during the traveling is decreased. For example, the friction coefficient μ on the road surface is estimated based on information such as road surface information or weather information supplied by occasional communication. When the friction coefficient μ is equal to or more than the predetermined value $\mu1$, it is determined that the permission condition is satisfied.

For example, the drive switching permission determination unit 118 determines whether or not a slip amount S or a slip ratio Sr of each of the front and rear wheels is less than a predetermined value S1 (Sr1). The slip amount S is calculated by an absolute value (|Nf−Nr|) between the rotation speed Nf of the front wheel 12 and the rotation speed Nr of the rear wheel 14. For example, the slip ratio Sr is calculated by dividing (S/Nv) the slip amount S by the rotation speed Nv of the wheel calculated based on the vehicle speed V. The predetermined value S1 (Sr1) is determined in advance based on experimentation or the like. The predetermined value S1 (Sr1) is set to a low value at which stability of the vehicle can be approximately maintained even when it is switched to 2WD_d traveling. When the slip amount S or the slip ratio Sr is less than the predetermined value (S<S1 or Sr<Sr1), it is determined that the permission condition is satisfied.

For example, the drive switching permission determination unit 118 stores slip history of the road surface on which the vehicle 8 slips (the slip amount S is equal to or more than the predetermined value) during the past traveling, and determines whether or not there is the slip history on the road surface during the traveling. When the slip history is not present, it is determined that the permission condition is satisfied.

When the stepping on the accelerator pedal is suddenly released (accelerator pedal sudden off-operation), the drive switching permission determination unit 118 determines whether or not the elapsed time T from the operation elapses a predetermined value Tac1. The predetermined value Tac1 is set in advance based on experimentation or the like. The predetermined value Tac1 is set to a value at which a change in the driving force by the sudden stepping release of the accelerator pedal is approximately converged. When the elapsed time T elapses (T>Tac1) the predetermined value Tac1, it is determined that the permission condition is satisfied.

For example, the drive switching permission determination unit 118 determines whether or not the steering angle θ is less than a predetermined value θ2 (θ<θ2). The predetermined value θ2 is set in advance based on experimentation or the like. The predetermined value θ2 is set to a low value which does not approximately influence the stability of the vehicle 8 even when it is switched to 2WD_d traveling. When the steering angle θ is less than the predetermined value θ2, it is determined that the permission condition is satisfied.

For example, the drive switching permission determination unit 118 determines whether or not a vehicle speed fluctuation ratio ΔV (vehicle speed change ratio) which is a change amount per unit time of the vehicle speed V is less than a predetermined value ΔV1 (ΔV<ΔV1). The predetermined value ΔV1 is a value set in advance based on experimentation or the like. The predetermined value ΔV1 is set to a value at which the vehicle 8 is stabilized even when it is switched to the 2WD_d traveling. When the vehicle speed fluctuation ratio ΔV of the vehicle speed V is less than the predetermined value ΔV1, it is determined that the permission condition is satisfied.

For example, the drive switching permission determination unit 118 determines whether or not an engine torque fluctuation ratio ΔTe (hereinafter, referred to as a torque fluctuation ratio ΔTe) which is a change amount per unit time of the engine torque Te is less than a predetermined value ΔTe1 (ΔTe<ΔTe1). The predetermined value ΔTe1 is set in advance based on experimentation or the like. The predetermined value ΔTe1 is set to a value at which the vehicle 8 is stabilized even when it is switched to the 2WD_d traveling. When the torque fluctuation ratio ΔTe is less than the predetermined value ΔTe1, it is determined that the permission condition is satisfied.

The drive switching permission determination unit 118 determines whether or not the drive state at the current time point is in a traveling state other than the 2WD_d traveling. When the traveling state of the current time point is in the 2WD_d traveling state in advance, the switching to the 2WD_d traveling is not required, and it is confirmed whether or not the drive state is in the 2WD_d traveling. When the drive state is in the traveling state other than the 2WD_d traveling, the permission condition is satisfied.

When all permission conditions described above are satisfied, the drive switching permission determination unit 118 determines that the disconnection permission condition is satisfied. When the drive switching control unit 116 receives the switching permission determination to the 2WD_d traveling, the drive switching control unit starts the switching control to the 2WD_d traveling.

When a condition (hereinafter, referred to as a disconnection stop condition) stopping the 2WD_d traveling is satisfied while the traveling is performed by the 2WD_d traveling, the drive switching control unit 116 connects the first clutch 36 and the second clutch 54 and switches the traveling to either the 4WD traveling or the 2WD traveling.

Whether or not the disconnection stop condition stopping the 2WD_d traveling is satisfied is determined by the drive switching stop determination unit 119. For example, the drive switching stop determination unit 119 determines whether or not the disconnection stop condition is satisfied based on a plurality of stop conditions stopping the 2WD_d traveling described below while the traveling is performed by the 2WD_d traveling.

For example, the drive switching stop determination unit 119 determines whether or not the traveling is performed by the current 2WD_d traveling. When the traveling is performed by the 2WD_d traveling, it is determined that the stop condition is satisfied.

For example, the drive switching stop determination unit 119 determines whether or not the friction coefficient μ on the road surface during the traveling is less than (μ<μ2) a predetermined value μ2. The predetermined value μ2 is determined in advance based on experimentation or the like. For example, the predetermined value μ2 is set to a threshold value of the friction coefficient μ at which slip is easily generated. When the friction coefficient μ is less than the predetermined value μ2, it is determined that the stop condition is satisfied.

For example, the drive switching stop determination unit 119 determines whether or not the slip amount S or the slip ratio Sr of the drive wheel is equal to or more than a predetermined value S2 (Sr2) (S≥S2 or Sr≥Sr2). The predetermined value S2 (Sr2) is set in advance based on experimentation or the like. For example, the predetermined value S2 is set to a threshold of a value at which the stability of the vehicle 8 during the 2WD_d traveling is deteriorated. When the slip amount S or the slip ratio Sr is equal to or more than the predetermined value, it is determined that the stop condition is satisfied.

For example, the drive switching stop determination unit 119 determines whether or not the steering angle θ is equal to or more than a predetermined value θ3. The predetermined value θ3 is determined in advance based on experimentation or the like. The predetermined value θ3 is set to a value at which the stability of the vehicle 8 during the 2WD_d traveling is decreased. When the steering angle θ is equal to or more than the predetermined value θ3 (θ>θ3), it is determined that the stop condition is satisfied.

For example, the drive switching stop determination unit 119 determines whether or not the vehicle speed fluctuation ratio ΔV is equal to or more than a predetermined value ΔV2 (ΔV≥ΔV2). The predetermined value ΔV2 is set in advance based on experimentation or the like. The predetermined value V2 is set to a threshold of a value at which a decrease in the stability of the vehicle 8 during the 2WD_d traveling is determined. When the vehicle speed fluctuation ratio ΔV is equal to or more than the predetermined value ΔV2, it is determined that the stop condition is satisfied.

For example, the drive switching stop determination unit 119 determines whether or not the torque fluctuation ratio ΔTe of the engine torque Te is equal to or more than a predetermined value ΔTe2 (ΔTe≥ΔTe2). The predetermined value ΔTe2 is set in advance based on experimentation or the like. The predetermined value ΔTe2 is set to a threshold of a value at which a decrease in the stability of the vehicle 8 during the 2WD_d traveling is determined. When the torque fluctuation ratio is equal to or more than the predetermined value ΔTe2, it is determined that the stop condition is satisfied.

When the current traveling state is in the 2WD_d traveling state and any of the stop conditions (μ<μ2, S≥S2, Sr≥Sr2, θ≥θ3, ΔV≥ΔV2, ΔTe≥ΔTe2) with respect to the friction coefficient μ, on the road surface, the slip amount S, the slip ratio Sr, the steering angle θ, the vehicle speed fluctuation ratio ΔV, and the torque fluctuation ratio ΔTe is satisfied, the drive switching stop determination unit 119 determines that the disconnection stop condition is satisfied. When the disconnection stop condition is satisfied, the drive switching control unit 116 controls the first actuator 47 controlling the first clutch 36 and the second actuator 65 controlling the second clutch 54, and starts the control which connects the first clutch 36 and the second clutch 54. Accordingly, the 2WD_d traveling is switched to either the 4WD traveling or the 2WD traveling.

In either the state where the automatic transmission 16 is in the neutral state or the N inertia running in which the transmission torque is controlled to be less than or equal to the predetermined value, the switching condition change unit 120 is configured to change the disconnection permission condition so as to be alleviated (a side in which the switching is easily performed to 2WD_d traveling) compared to when the N inertia running is not performed (when the transmission torque of the transmission (16) is controlled to be greater than the predetermined value). The disconnection permission condition is determined by the drive switching permission determination unit 118, and determines whether or not it is switched to the 2WD_d traveling. The disconnection permission condition is an example of a condition which permits the disconnection of a connection-disconnection mechanism of the present invention. The side, in which the switching is easily performed to 2WD_d traveling compared to when the N inertia running is not performed, is an example of a side in which the connection-disconnection mechanism of the present invention is easily disconnected.

For example, the switching condition change unit 120 changes the predetermined value of the friction coefficient μ on the road surface set as one of the permission conditions from the predetermined value μ1 to the predetermined value μ3 during the N inertia running. The predetermined value μ3 is set to a value which is smaller than the predetermined value μ1 and is more than the predetermined value μ2 ($\mu 2 < \mu 3 < \mu 1$). The drive switching permission determination unit 118 determines whether or not the permission condition is satisfied based on the predetermined value μ3 which is lower than the predetermined value μ1. Specifically, the drive switching permission determination unit determines whether or not the permission condition is satisfied based on whether or not the friction coefficient μ is equal to or more than the predetermined value μ3 ($\mu \geq \mu 3$). Accordingly, the permission condition during the N inertia running is alleviated compared to when the N inertia running is not performed.

For example, the switching condition change unit 120 changes the predetermined value of the slip amount S or the slip ratio Sr of each of the front and rear wheels set as one of the permission conditions from the predetermined value S1 (Sr1) to the predetermined value S3 (Sr3) during the N inertia running. The predetermined value S3 (Sr3) is set to a value which is more than S1 (Sr1) and is smaller than the predetermined value S2 (Sr2). The drive switching permission determination unit 118 determines whether or not the permission condition is satisfied based on the predetermined value S3 (Sr3) which is more than the predetermined value S1 (Sr1). Specifically, the drive switching permission determination unit determines whether or not the permission condition is satisfied based on whether or not the slip amount S or the slip ratio Sr is less than the predetermined value S3 (Sr3) (S<S3 or Sr<Sr3). Accordingly, the permission condition during the N inertia running is alleviated compared to when the N inertia running is not performed.

The switching condition change unit 120 deletes the determination with respect to the slip history of the wheel during the N inertia running. That is, since the drive switching permission determination unit 118 does not perform the determination with respect to the presence or absence of the slip history during the N inertia running, and as a result, the permission condition during the N inertia running is alleviated compared to when the N inertia running is not performed.

For example, the switching condition change unit 120 changes the predetermined value of the elapsed time T from the accelerator pedal sudden off-operation which is set as one of the permission conditions from the predetermined value Tac1 to the predetermined value Tac2 during the N inertia running. The predetermined value Tac2 is set to a value which is smaller than the predetermined value Tac1. The drive switching permission determination unit 118 determines whether or not the permission condition is satisfied based on the predetermined value Tac2, specifically, determines whether or not the permission condition is satisfied based on whether or not the elapsed time T elapses the predetermined value Tac2 (T>T2). Accordingly, the permission condition during the N inertia running is alleviated compared to when the N inertia running is not performed.

For example, the switching condition change unit 120 changes the predetermined value of the steering angle θ set as one of the permission conditions from the predetermined value θ2 to the predetermined value θ4 during the N inertia running. The predetermined value θ4 is set to a value more than the predetermined value θ2 (θ4>θ2). The drive switching permission determination unit 118 determines whether or not the permission condition is satisfied based on the predetermined value θ4, specifically, determines whether or not the permission condition is satisfied based on whether or not the steering angle θ is less than the predetermined value θ4 (θ<θ4). Accordingly, the permission condition during the N inertia running is alleviated compared to when the N inertia running is not performed.

For example, the switching condition change unit 120 changes the predetermined value of the vehicle speed fluctuation ratio ΔV set as one of the permission conditions from the predetermined value ΔV1 to the predetermined value ΔV2 during the N inertia running. The predetermined value ΔV2 is set to a value more than the predetermined value ΔV1 (ΔV2>ΔV1). The drive switching permission determination unit 118 determines whether or not the permission condition is satisfied based on the predetermined value ΔV2, specifically, determines whether or not the permission condition is satisfied based on whether or not the vehicle speed fluctuation ratio ΔV is less than the predetermined value ΔV2 (ΔV<ΔV2). Accordingly, the permission condition during the N inertia running is alleviated compared to when the N inertia running is not performed.

For example, the switching condition change unit 120 changes the predetermined value of the torque fluctuation ratio ΔTe set as one of the permission conditions from the predetermined value ΔTe1 to the predetermined value ΔTe2 during the N inertia running. The predetermined value ΔTe2 is set to a value more than the predetermined value ΔTe1 (ΔTe2>ΔTe1). The drive switching permission determination unit 118 determines whether or not the permission condition is satisfied based on the predetermined value ΔTe2, specifically, determines whether or not the permission condition is satisfied based on whether or not the vehicle speed fluctuation ratio ΔTe is less than the predetermined value ΔTe2 (ΔTe<ΔTe2). Accordingly, the permission condition during the N inertia running is alleviated compared to when the N inertia running is not performed.

When all permission conditions changed by the switching condition change unit 120 are satisfied, the drive switching permission determination unit 118 determines that the disconnection permission condition is satisfied. Here, since all permission conditions, which determine the switching to the 2WD_d traveling during the N inertia running, are alleviated compared to when the N inertia running is not performed, the disconnection permission condition is easily satisfied. Accordingly, the switching to the 2WD_d traveling during the N inertia running is easily performed, and thus, it is switched to the 2WD_d traveling while being controlled under the N inertia running state. Therefore, the time controlled to the N inertia running coincides with the time switched to the 2WD_d traveling.

When the N inertia running is stopped, the switching condition change unit 120 returns each permission condition to the state before the N inertia running. That is, the state, in which the transmission is easily switched to the 2WD_d traveling, ends.

Figure 4:
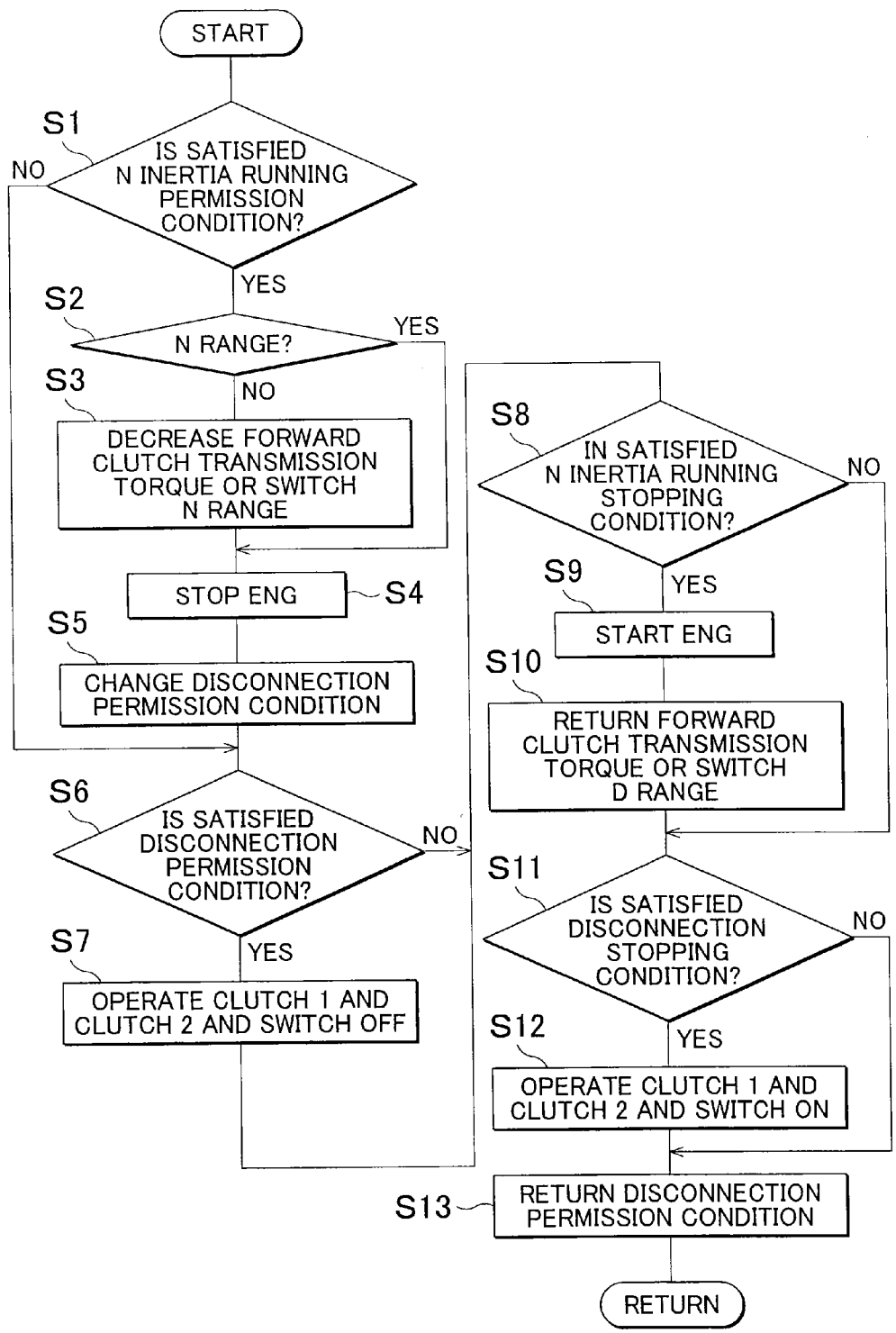
FIG. 4 is a flowchart illustrating a main portion of a control operation of an electronic control unit of FIG. 3, that is, illustrating a control operation which further decreases traveling resistance and further improves fuel efficiency during traveling in a state where an automatic transmission is controlled to be in a neutral state or in a state where transmission torque is controlled to be less than or equal to a predetermined value.

FIG. 4 is a flowchart illustrating a main portion of the control operation of the electronic control unit 80, that is, illustrating the control operation which further decreases the traveling resistance during traveling and improves fuel efficiency when the automatic transmission 16 is controlled to be in a neutral state or when the transmission torque is controlled to be less than or equal to a predetermined value. The flowchart is performed to be repeated with an extremely short time cycle having approximately several msec to several tens msec.

First, in Step S1 (hereinafter, Step is omitted) corresponding to the N inertia running permission determination unit 114, it is determined whether or not the above-described permission condition of the N inertia running is satisfied. When the S1 is negative, it proceeds to S6 described below. When the S1 is positive, in S2 corresponding to the transmission control unit 112, it is determined whether or not the automatic transmission 16 is switched to the neutral range (N range). When the S2 is positive, it proceeds to S4 described below. When the S2 is negative, in S3 corresponding to the transmission control unit 112, it is switched to either the state where the automatic transmission 16 is in the neutral state or the state where the transmission torque is less than or equal to the predetermined value. That is, it is switched to the N inertia running state. In S4 corresponding to the engine output control unit 110, the engine 10 is stopped when the accelerator opening Acc becomes zero.

Subsequently, in S5 corresponding to the switching condition change unit 120, the permission condition permitting the switching to the 2WD_d traveling is changed from the N inertia running state to the side in which the switching is easily performed to the 2WD_d traveling (so as to be alleviated) compared to the traveling other than the N inertia running. In S6 corresponding to the drive switching permission determination unit 118, it is determined whether or not the above-described disconnection permission condition is satisfied. When the S6 is negative, it proceeds to S8 described below. When the S6 is positive, in S7 corresponding to the drive switching control unit 116, the first clutch 36 and the second clutch 54 are disconnected, and it is switched to the 2WD_d traveling. In S8 corresponding to the N inertia running stop determination unit 115, it is determined whether or not the condition stopping the N inertia running is satisfied. When the S8 is negative, it proceeds to S11 described below. When the S8 is positive, in S9 corresponding to the engine output control unit 110, the engine 10 starts. Subsequently, in S10 corresponding to the transmission control unit 112, the N inertia running is stopped by either increasing the transmission torque of the automatic transmission 16 or allowing the switching to the D range which is the power transmission range.

In S11 corresponding to the drive switching stop determination unit 119, it is determined whether or not the disconnection stop condition is satisfied, in which either the switching from the 2WD_d traveling to the 4WD traveling or the switching from the 2WD_d traveling to the 2WD traveling is performed. When the S11 is negative, it proceeds to S13 described below. When the S11 is positive, in S12 corresponding to the drive switching control unit 116, the first clutch 36 and the second clutch 54 are connected to each other, and thus, either the switching from the 2WD_d traveling to the 4WD traveling or the switching from the 2WD_d traveling to the 2WD traveling is performed. In the S13 corresponding to the switching condition change unit 120, the disconnection permission condition which allows the switching to the 2WD_d traveling is returned to a normal permission condition.

As described above, according to the present embodiment, when the condition allowing the switching to the N inertia running is satisfied during the traveling, the automatic transmission 16 is controlled to be in the neutral state and the transmission torque is controlled to be less than or equal to the predetermined value. During this, the first clutch 36 and the second clutch 54 are disconnected, and thus, the power transmission path between the automatic transmission 16 (or the first clutch 36) and the second clutch 54 is disconnected. Accordingly, the co-rotation of the rotating elements configuring the power transmission path between the automatic transmission 16 (or the first clutch 36) and the second clutch 54 is prevented. Therefore, since the rotation resistance due to the co-rotation of the rotating elements is decreased and the traveling resistance is decreased, the timing of stepping on the accelerator pedal during the deceleration is delayed compared to when the co-rotation is generated, and the fuel efficiency can be further improved.

According to the present embodiment, during the N inertia running in which the automatic transmission 16 is controlled to be in the neutral state or the transmission torque is controlled to be less than or equal to the predetermined value, the first clutch 36 and the second clutch 54 are easily disconnected compared to when the N inertia running is not performed. Accordingly, it is switched to the 2WD_d traveling during the N inertia running, and thus, the co-rotation of the rotating elements configuring the power transmission path between the automatic transmission 16 and the second clutch 54 is prevented, and the traveling resistance can be decreased.

According to the present embodiment, the condition permitting the switching to the 2WD_d traveling includes at least one of the conditions with respect to the friction coefficient μ on the road surface, the slip amount S of the drive wheel, the slip ratio Sr of the drive wheel, the slip history of the drive wheel, the steering angle θ, the fluctuation ratio $\Delta Te$ of the engine torque, and the fluctuation ratio $\Delta V$ of the vehicle speed. In this way, while the automatic transmission 16 is in the neutral state or the transmission torque is less than or equal to the predetermined value, by appropriately changing the determination value with respect to the condition, the first clutch 36 and the second clutch 54 can be easily changed to the side in which the first clutch 36 and the second clutch 54 are easily disconnected (the side which is switched to the 2WD_d traveling).

According to the present embodiment, the fuel efficiency is further improved by stopping the engine 10 while the automatic transmission 16 is controlled to be in the neutral state or the transmission torque is controlled to be less than or equal to the predetermined value.

According to the present embodiment, the first clutch 36 and the second clutch 54 are disconnected when the switching to the 2WD_d traveling is performed. Accordingly, the co-rotation of the rotating elements configuring the power transmission path between the first clutch 36 and the second clutch 54 can be securely prevented.

Next, another embodiment of the present invention will be described. In descriptions below, the same reference numerals are assigned to the portions common to the above-described embodiment, and the descriptions thereof are omitted.

In the first embodiment, the condition permitting the switching to the N inertia running and the condition permitting the switching to the 2WD_d traveling are different from each other. In a second embodiment, the condition permitting the N inertia running includes the condition permitting the switching to the 2WD_d traveling. That is, in the second embodiment, the condition permitting the switching to the 2WD_d traveling is satisfied if the condition permitting the switching to the N inertia running is satisfied.

Figure 5:
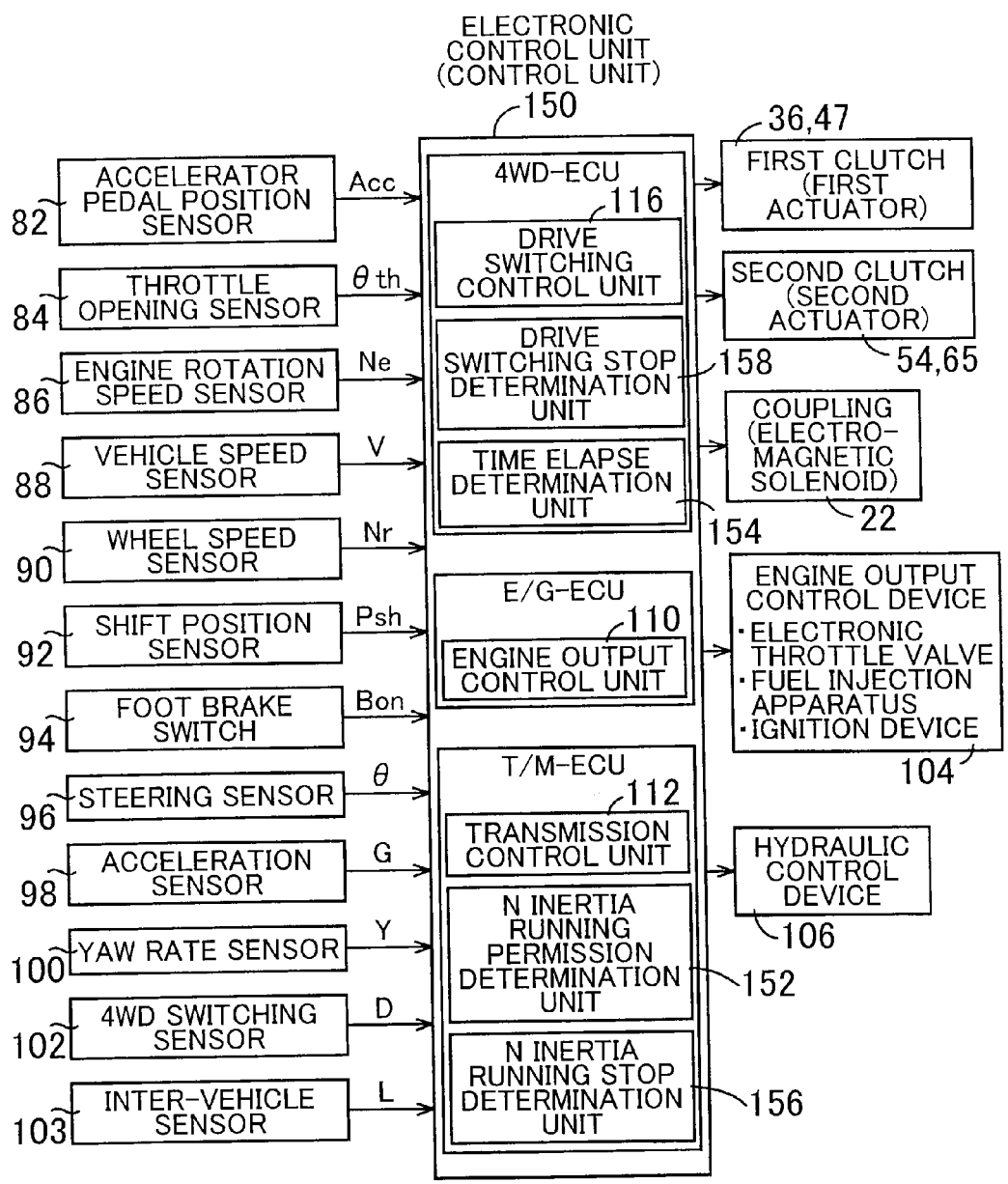
FIG. 5 is a functional block diagram illustrating a main portion of a control function of an electronic control unit according to another embodiment of the present invention.

FIG. 5 is a functional block diagram illustrating a main portion of a control operation according to the present embodiment. In FIG. 5, since the engine output control unit 110, the transmission control unit 112, and the drive switching control unit 116 have the same functions as the above-described embodiment, the same reference numerals are assigned, and the descriptions thereof are omitted.

An N inertia running permission determination unit 152 of FIG. 5 determines whether or not the permission condition switching the transmission to the N inertia running is satisfied. The N inertia running permission determination unit 152 performs the determination based on whether or not a plurality of N inertia running permission conditions described below are satisfied.

For example, the N inertia running permission determination unit 152 determines whether or not the accelerator opening Acc is less than the predetermined value A1 (A<A1). The predetermined value A1 is set to the same value as the above-described embodiment. When the accelerator opening Acc is less than the predetermined value A1, it is determined that one of the conditions permitting the N inertia running is satisfied.

For example, the N inertia running permission determination unit 152 determines whether or not the friction coefficient μ on the road surface is equal to or more than the predetermined value μ1 (μ≥μ1). The predetermined value μ1 is set to the same value as the predetermined value μ1 of the above-described embodiment. When the friction coefficient μ is equal to or more than the predetermined value μ1, it is determined that one of the conditions permitting the N inertia running is satisfied.

For example, the N inertia running permission determination unit 152 determines whether or not the slip amount S or the slip ratio Sr of each of the front and rear wheels is less than the predetermined value S1 (Sr1) (S<S1 or Sr<Sr1). The predetermined value S1 (Sr1) is set to the same value as the predetermined value S1 (Sr1) of the above-described embodiment. When the slip amount S or the slip ratio Sr is less than the predetermined value S1, it is determined that one of the conditions permitting the N inertia running is satisfied.

For example, the N inertia running permission determination unit 152 determines whether or not the vehicle speed V is equal to or more than the predetermined value V1. The predetermined value V1 is set to the same value as the predetermined value V1 of the above-described embodiment. When the vehicle speed V is equal to or more than the predetermined value V1, it is determined that one of the conditions permitting the N inertia running is satisfied.

For example, the N inertia running permission determination unit 152 determines whether or not the steering angle θ is less than the predetermined value θ1. The predetermined value θ1 is set to the same value as the predetermined value θ1 of the above-described embodiment. When the steering angle θ is equal to or more than the predetermined value θ1, it is determined that one of the conditions permitting the N inertia running is satisfied.

For example, the N inertia running permission determination unit 152 determines whether or not the vehicle speed fluctuation ratio ΔV (vehicle speed change ratio) of the vehicle speed V is less than the predetermined value ΔV1 (ΔV<ΔV1). The predetermined value ΔV1 is a value which is set in advance based on experimentation or the like and is set to a value at which the vehicle 8 is stabilized even when it is switched to the N inertia running. When the vehicle speed fluctuation ratio ΔV of the vehicle speed V is less than the predetermined value ΔV1, it is determined that one of the conditions permitting the N inertia running is satisfied.

For example, the N inertia running permission determination unit 152 determines whether or not the engine torque fluctuation ratio ΔTe (hereinafter, referred to as the torque fluctuation ratio ΔTe) of the engine torque Te is less than the predetermined value ΔTe1 (ΔTe<ΔTe1). The predetermined value ΔTe1 is a value which is set in advance based on experimentation or the like and is set to a value at which the vehicle 8 is stabilized even when it is switched to the N inertia running. When the torque fluctuation ratio ΔTe is less than the predetermined value ΔTe1, it is determined that one of the conditions permitting the N inertia running is satisfied.

The N inertia running permission determination unit 152 determines whether or not the current traveling state is the traveling state (non-N inertia running) other than the N inertia running, the traveling state other than the 2WD_d traveling, or the traveling state of the non-N inertia running and the current traveling state is any of the traveling states (non-2WD_d traveling) other than the 2WD_d traveling. When the current traveling state is the non-inertia running, the non-2WD_d traveling, or the non-2WD_d traveling and the current traveling state is any of the non-2WD traveling, it is determined that one of the conditions permitting the N inertia running is satisfied.

When all conditions permitting the N inertia running are satisfied, the N inertia running permission determination unit 152 determines that the permission condition allowing the switching to the N inertia running is satisfied. When it is determined that it is switched to the N inertia running, the transmission control unit 112 controls the automatic transmission 16 to be in the neutral state or the state where the transmission torque is less than or equal to the predetermined value, and it is switched to the N inertia running. When it is switched to the N inertia running, the engine output control unit 110 stops the fuel supply to the engine 10 and stops the engine 10 when the accelerator opening Acc is 0.

As described above, when the permission condition allowing the switching to the N inertia running is satisfied, the permission condition allowing the switching to the 2WD_d traveling is also satisfied. Accordingly, if the permission condition allowing the switching to the N inertia running is satisfied, the drive switching control unit 116 switches the drive state to the 2WD_d traveling. In order words, since the satisfaction of the permission condition allowing the switching to the N inertia running is achieved according to the satisfaction of the switching permission condition (disconnection permission condition) to the 2WD_d traveling, the condition permitting the switching to the 2WD_d traveling is included in a predetermined condition permitting the N inertia running. The predetermined condition is an example of the condition in which the transmission torque of the transmission of the present invention is controlled to be less than or equal to a predetermined value. The condition permitting the switching to the 2WD_d traveling is an example of the condition permitting the disconnection of the connection-disconnection mechanism of the present invention.

When it is switched to the 2WD_d traveling, a time elapse determination unit 154 is performed. The time elapse determination unit 154 measures the elapsed time T with the time point, at which the permission condition allowing the switching to the N inertia running is satisfied, as the starting point, and determines whether or not the elapsed time T elapses a predetermined time T1. While the elapsed time T does not elapse the predetermined time T1, the switching control to the 2WD_d traveling by the drive switching control unit 116 is held on standby (is prohibited). After the elapsed time T elapses the predetermined time T1, the switching to the 2WD_d traveling by the drive switching control unit 116 starts. The predetermined time T1 is an example of a predetermined time until the connection and disconnection of the connection-disconnection mechanism start after the condition permitting the connection and disconnection of the connection-disconnection mechanism of the present invention is satisfied.

Figure 6:
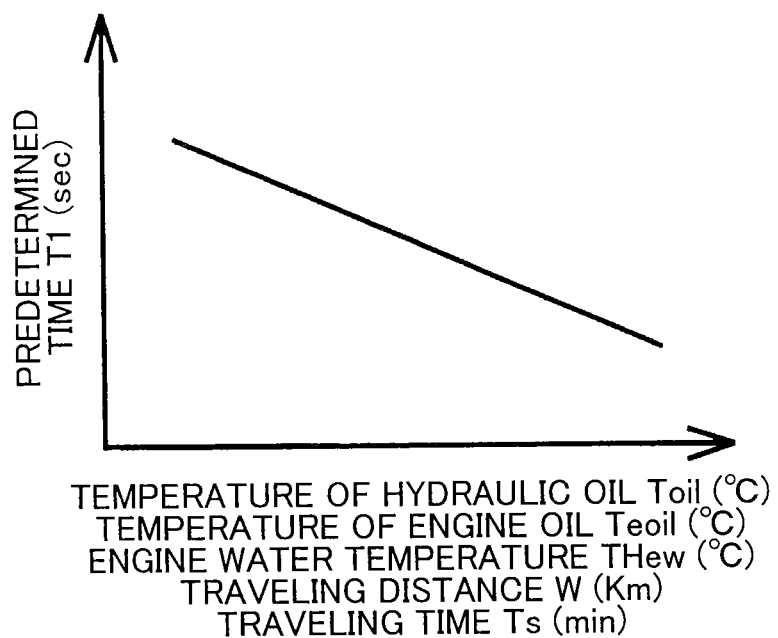
FIG. 6 is a relationship diagram showing relationships between a predetermined time set from a time point when a permission condition switching the transmission to 2WD_d traveling is satisfied until the switching to 2WD_d traveling actually starts, and a temperature of a hydraulic oil of the automatic transmission, a temperature of an engine oil, an engine coolant temperature, an outside air temperature, a traveling distance from the traveling start point, or a traveling time from the traveling start time.

The predetermined time T1 is set in advance based on experimentation or the like. The predetermined time T1 is a time ensuring that the automatic transmission 16 is controlled to be in the neutral state or the transmission torque is controlled to be less than or equal to the predetermined value and the vehicle 8 is stabilized when the drive switching control unit 116 starts. For example, the predetermined time T1 is appropriately changed based on the oil temperature Toil of the hydraulic oil of the automatic transmission 16, the oil temperature Teoil of the engine oil, the engine coolant temperature THew, the outside air temperature Tair, the traveling distance W from the traveling start point, or the traveling time Ts. For example, the time during which the automatic transmission 16 becomes the neutral state or the transmission torque becomes less than or equal to the predetermined value is also lengthened as the oil temperature Toil of the hydraulic oil is decreased. Accordingly, as shown in FIG. 6, the predetermined time T1 is set to be lengthened as the oil temperature Toil of the hydraulic oil is decreased. Similarly, as shown in FIG. 6, the predetermined time T1 is set to be lengthened as the oil temperature Teoil of the engine oil is decreased. The predetermined time T1 is set to be lengthened as the engine coolant temperature THew is decreased. The predetermined time T1 is set to be lengthened as the outside air temperature Tair is decreased. Since the oil temperature Toil of the hydraulic oil or the like is increased if the traveling distance W or the traveling time Ts is lengthened, the time during which the automatic transmission 16 becomes the neutral state or the transmission torque becomes less than or equal to the predetermined value is gradually shortened. Accordingly, as shown in FIG. 6, the predetermined time T1 is set to be shortened as the traveling distance W or the traveling time Ts is lengthened.

In this way, since the vehicle 8 is switched to the 2WD_d traveling if the elapsed time T elapses the predetermined time T1, the time during which the N inertia running is performed and the time during which the 2WD_d traveling is performed are partially overlapped with each other. Accordingly, the 2WD_d traveling is performed during the N inertia running, the co-rotation of the rotating elements is prevented, and thus, the traveling resistance is further decreased. Since the timing of re-acceleration by stepping on the accelerator pedal according to deceleration is also delayed, the fuel efficiency is further improved.

Return to FIG. 5, when the predetermined condition in which the N inertia running during the traveling is stopped is satisfied in the state where it is switched to the N inertia running, the N inertia running stop determination unit 156 performs either the control in which the automatic transmission 16 is set to the power transmission range (D range) or the control in which the transmission torque is returned to the magnitude by which the normal traveling is possible, and stops the N inertia running. Whether or not the N inertia running is stopped is determined by the N inertia running stop determination unit 156. For example, the N inertia running stop determination unit 156 determines whether or not stopping the N inertia running, based on the stop conditions of a plurality of N inertia running stop conditions described below.

The N inertia running stop determination unit 156 determines whether or not the current traveling state is the inertia running. When the traveling state of the current time point is in the traveling state other than the N inertia running in advance, since the switching from the N inertia running is impossible, it is confirmed whether or not the switching from the N inertia running is possible.

For example, the N inertia running stop determination unit 156 determines whether or not the accelerator opening Acc is equal to or more than the predetermined value A2 (Acc≥A2). For example, the predetermined value A2 is set to the same value as the predetermined value A2 of the above-described embodiment. When the accelerator opening Acc is equal to or more than the predetermined value A2, it is determined that the stop condition of the N inertia running is satisfied.

For example, the N inertia running stop determination unit 156 determines whether or not the vehicle speed V is less than the predetermined value V2 (V<V2). For example, the predetermined value V2 is set to the same value as the predetermined value V2 of the above-described embodiment. When the vehicle speed V is less than the predetermined value V2, it is determined that the stop condition of the N inertia running is satisfied.

For example, the N inertia running stop determination unit 156 determines whether or not the steering angle θ is equal to or more than the predetermined value θ2 (θ≥θ2). For example, the predetermined value θ2 is set to the same value as the predetermined value θ2 of the above-described embodiment. When the steering angle θ is equal to or more than the predetermined value θ2, it is determined that the stop condition of the N inertia running is satisfied.

When the current traveling state is in the N inertia running and any of the above-described stop conditions (Acc≥A2, V<V2, θ≥θ2) of the N inertia running is satisfied, the N inertia running stop determination unit 156 determines that the N inertia running is stopped. When it is determined that the N inertia running is stopped, the engine output control unit 110 starts the stopped engine 10. At this time, the transmission control unit 112 performs either the control of switching the automatic transmission 16 to the power transmission range (D range) in cooperation with the starting of the engine 10 or the control of increasing the transmission torque, and thus, engine overrun (high engine rotation) generated during the starting of the engine is prevented.

The drive switching stop determination unit 158 determines whether or not the disconnection stop condition stopping the 2WD_d traveling is satisfied during the 2WD_d traveling. For example, the drive switching stop determination unit 158 determines whether or not the disconnection stop condition is satisfied based on a plurality of stop conditions described below, which determine the stopping of the 2WD_d traveling, while the traveling is performed by the 2WD_d traveling.

For example, the drive switching stop determination unit 158 determines whether or not the traveling is performed by the current 2WD_d traveling. When the traveling is performed by the 2WD_d traveling, it is determined that the stop condition is satisfied.

For example, the drive switching stop determination unit 158 determines whether or not one of the slip amount S of the drive wheel and the slip ratio Sr of the drive wheel is equal to or more than the predetermined value S2 (Sr2). For example, the predetermined value S2 (Sr2) is set to the same value as the predetermined value S2 (Sr2) of the above-described embodiment. When the slip amount S or the slip ratio Sr is equal to or more than the predetermined value, it is determined that the stop condition is satisfied.

For example, the drive switching stop determination unit 158 determines whether or not the accelerator opening Acc is equal to or more than a predetermined value A3 (Acc≥A3). The predetermined value A3 is set in advance based on experiment or the like, and is set to a value which is more than (A3>A2) the predetermined value A2 determining the stop of the above-described N inertia running, for example. When the accelerator opening Acc is equal to or more than the predetermined value A3, it is determined that the stop condition is satisfied.

For example, the drive switching stop determination unit 158 determines whether or not the friction coefficient μ on the road surface during the traveling is less than (μ<μ2) the predetermined value μ2. For example, the predetermined value μ2 is set to the same value as the predetermined value μ2 of the above-described embodiment. When the friction coefficient μ is less than the predetermined value μ2, it is determined that the stop condition is satisfied.

For example, the drive switching stop determination unit 158 determines whether or not the vehicle speed V is less than a predetermined value V3 (V<V3). For example, the predetermined value V3 is set in advance based on experimentation or the like, and is set to the lower limit of the vehicle speed V at which the 2WD_d traveling is permitted. When the vehicle speed V is less than the predetermined value V3, it is determined that the stop condition is satisfied.

For example, the drive switching stop determination unit 158 determines whether or not the steering angle θ is equal to or more than the predetermined value θ3 (θ≥θ3). For example, the predetermined value θ3 is set to the same value as the predetermined value θ3 of the above-described embodiment. When the steering angle θ is equal to or more than the predetermined value θ3, it is determined that the stop condition is satisfied.

For example, the drive switching stop determination unit 158 determines whether or not the vehicle speed fluctuation ratio ΔV of the vehicle speed V is equal to or more than the predetermined value ΔV2 (ΔV≥ΔV2). The predetermined value ΔV2 is set in advance based on experimentation or the like, and is set to a threshold of a value at which a decrease in the stability of the vehicle 8 during the 2WD_d traveling is determined. When the vehicle speed fluctuation ratio ΔV is equal to or more than the predetermined value ΔV2, it is determined that the stop condition is satisfied.

For example, the drive switching stop determination unit 158 determines whether or not the torque fluctuation ratio ΔTe of the engine torque Te is equal to or more than the predetermined value ΔTe2 (ΔTe≥ΔTe2). The predetermined value ΔTe2 is set in advance based on experimentation or the like, and is set to a lower limit value at which a decrease in the stability of the vehicle 8 during the 2WD_d traveling is determined. When the torque fluctuation ratio is equal to or more than the predetermined value ΔTe2, it is determined that the stop condition is satisfied.

When the current traveling state is in the 2WD_d traveling state and one of the stop conditions with respect to the slip amount S and the slip ratio Sr of the above-described drive wheel, the accelerator opening Acc, the friction coefficient μ on the road surface, the vehicle speed V, the steering angle θ, the vehicle speed fluctuation ratio ΔV, and the torque fluctuation ratio ΔTe is satisfied, the drive switching stop determination unit 158 determines that the disconnection stop condition by which the 2WD_d traveling is stopped is satisfied. When the disconnection stop condition is satisfied, the drive switching control unit 116 connects the first clutch 36 and the second clutch 53 and performs either the switching from the 2WD_d traveling to the 4WD traveling or the switching from the 2WD_d traveling to the 2WD traveling.

FIG. 7 is a flowchart illustrating a main portion of the control operation of an electronic control unit 150, that is, illustrating the control operation which further decreases the traveling resistance during traveling and improves fuel efficiency when the automatic transmission 16 is controlled to be in the neutral state or when the transmission torque is controlled to be less than or equal to a predetermined value. The flowchart is performed to be repeated with an extremely short time cycle having approximately several msec to several tens msec.

First, in Step S1 (hereinafter, Step is omitted) corresponding to the N inertia running permission determination unit 152, it is determined whether or not the permission condition of the N inertia running is satisfied. When the S1 is negative, it proceeds to S8 described below. When the S1 is positive, in S2 corresponding to the transmission control unit 112, it is determined whether or not the automatic transmission 16 is switched to the neutral range. When the S2 is positive, it proceeds to S4 described below. When the S2 is negative, in S3 corresponding to the transmission control unit 112, it is switched to either the state where the automatic transmission 16 is in the neutral state or the state where the transmission torque is less than or equal to the predetermined value. That is, it is switched to the N inertia running state. In S4 corresponding to the engine output control unit 110, it is switched to the N inertia running and the engine 10 is stopped when the accelerator opening Acc becomes 0.

In S15 corresponding to the time elapse determination unit 154, it is determined whether or not the predetermined time T1 elapses from the time point when the permission condition switching the transmission to the N inertia running determined in Step S1 is satisfied, in other words, the time point when the disconnection permission condition allowing the switching to the 2WD_d traveling is satisfied. When the S15 is negative, it is returned to S15 and it is determined that the time elapse is repeated. When the predetermined time T1 elapses, the S15 is positive, and in the S7 corresponding to the drive switching control unit 116, the first clutch 36 and the second clutch 54 are disconnected and it is switched to the 2WD_d traveling. In S8 corresponding to the N inertia running stop determination unit 156, it is determined whether or not the condition stopping the N inertia running is satisfied. When the S8 is negative, it proceeds to S11 described below. When the S8 is positive, in S9 corresponding to the engine output control unit 110, the engine 10 starts. Subsequently, in S10 corresponding to the transmission control unit 112, the N inertia running is stopped by either increasing the transmission torque of the automatic transmission 16 or switching the transmission to the D range which is the power transmission range.

In the S11 corresponding to the drive switching stop determination unit 158, it is determined whether or not the disconnection stop condition is satisfied, in which either the switching from the 2WD_d traveling to the 4WD traveling or the switching from the 2WD_d traveling to the 2WD traveling is performed. When the S11 is negative, the present routine ends. When the S11 is positive, in S12 corresponding to the drive switching control unit 116, the first clutch 36 and the second clutch 54 are connected to each other, and thus, the switching from the 2WD_d traveling to the 4WD traveling or the switching from the 2WD_d to the 2WD traveling is performed, and the present routine ends.

As described above, also in the second embodiment, effects similar to the above-described first embodiment can be obtained. According to the second embodiment, when the automatic transmission 16 is controlled to be in the neutral state or the transmission torque is controlled to be less than or equal to the predetermined value, the first clutch 36 and the second clutch 54 are disconnected. Accordingly, the co-rotation of the rotating elements configuring the power transmission path between the automatic transmission 16 and the second clutch is prevented, and the traveling resistance can be decreased.

According to the second embodiment, at least one of conditions with respect to the accelerator opening Acc, the friction coefficient μ on the road surface, the slip amount S of the drive wheel, the slip ratio Sr of the drive wheel, the slip history of the drive wheel, the steering angle θ, the torque fluctuation ratio ΔTe of the engine torque Te, and the fluctuation ratio ΔV of the vehicle speed V is included in the condition in which the automatic transmission 16 is controlled to be in the neutral state or the transmission torque is controlled to be less than or equal to the predetermined value. Since any of the conditions is included in the condition permitting the switching to the 2WD_d traveling, when the automatic transmission 16 is controlled to be in the neutral state or the transmission torque is controlled to be less than or equal to the predetermined value, the first clutch 36 and the second clutch 54 are disconnected, and the co-rotation of the rotating elements is prevented.

According to the second embodiment, when the condition permitting the switching to the 2WD_d traveling is satisfied, the first clutch 36 and the second clutch 54 are disconnected after the predetermined time T1 elapses. Therefore, the control starts after the predetermined time T1 elapses and the vehicle 8 is stabilized, and the fluctuation of the vehicle 8 by the switching to the 2WD_d traveling can be suppressed.

According to the second embodiment, the predetermined time T1 is changed based on at least one of the oil temperature Toil of the hydraulic oil of the automatic transmission 16, the oil temperature Teoil of the engine oil, the engine coolant temperature THew, the outside air temperature Tair, the traveling distance W from the traveling start point, and the traveling time Ts. Accordingly, the switching to the 2WD_d traveling is performed in the state where the vehicle 8 is stabilized based on the above-described matter, and thus, the vehicle fluctuation during the switching can be suppressed.

As above, the embodiments of the present invention are described in detail with reference to the drawings. The present invention is also applied to other aspects.

For example, the above-described embodiments are independently described. Each of the embodiments may be appropriately combined to each other.

The four-wheel drive vehicle 8 of the above-described embodiments is an example, and if the four-wheel drive vehicle includes the connection-disconnection mechanism which disconnects the power transmission of the predetermined rotating element during the traveling, the present invention may be appropriately applied thereto. For example, even in a structure or the like in which the coupling is included in the rear differential, it is possible to disconnect the power transmission of the predetermined rotating element during the traveling by using the coupling as the connection-disconnection mechanism. In this way, if the four-wheel drive vehicle includes the connection-disconnection mechanism which disconnects the power transmission of the predetermined rotating element during the traveling, the present invention may be appropriately applied thereto.

In the above-described embodiments, the automatic transmission 16 is the stepped automatic transmission which is configured of the plurality of planetary gears and the plurality of friction engagement devices. For example, the structure of the transmission such as a gear transmission is not necessarily limited thereto. The transmission is not necessarily limited to the stepped transmission, and for example, may be appropriately changed to a transmission structure such as a belt continuously variable transmission.

In the above-described embodiments, the first clutch 36 and the second clutch 54 are claw clutches. The clutches are not limited to the claw clutches. That is, if the clutch has the configuration capable of connecting and disconnecting the portion between the rotating elements, the clutch can be appropriately applied. Each of the first clutch 36 and the second clutch 54 may further include a synchronization mechanism.

In the above-described embodiments, each four-wheel drive vehicle 8 is configured so as to always transmit the power to the front wheel side. The power transmission is not necessarily limited to the front wheel side, and the power may always be transmitted to the rear wheel side, and the power may be selectively transmitted to the front wheel side.

In the above-described embodiments, the time during which the automatic transmission 16 is controlled to be in the neutral state and the transmission torque is controlled to be less than or equal to the predetermined value and the time during which the four-wheel drive vehicle 8 is travelled according to the 2WD_d traveling are at least partially overlapped with each other. All times may not be necessarily overlapped with each other.

In the above-described embodiments, the details of the condition permitting the switching of the N inertia running, the condition stopping the switching of the N inertia running, the condition permitting the switching to the 2WD_d traveling, and the condition stopping the 2WD_d traveling are an example. The determination is performed based on some of the conditions of the vehicle speed V, the accelerator opening Acc, or the like, and thus, may be appropriately changed.

In the above-described embodiments, the switching to the 2WD_d traveling starts after the predetermined time T1 elapses from the time point when the disconnection permission condition switching the transmission to the 2WD_d traveling is satisfied. The switching may start at the same time as the disconnection permission condition is satisfied.

In the above-described embodiments, since the automatic transmission 16 becomes neutral when the N inertia running is performed, the power transmission path is approximately disconnected even in the automatic transmission 16. Accordingly, since the power transmission in the automatic transmission 16 and the second clutch 54 is disconnected when the 2WD_d traveling is performed, the first clutch 36 may not necessarily be disconnected.

The above-described matters are an embodiment of the present invention, and various modifications and improvement may be applied to the present invention based on knowledge of a person skilled in the art.

What is claimed is:

1. A control device for a four-wheel drive vehicle, the four-wheel drive vehicle including an engine, a transmission provided on a power transmission path between the engine and a main drive wheel and a subsidiary drive wheel, and a connection-disconnection mechanism provided on a power transmission path between the transmission and the subsidiary drive wheel to selectively connect and disconnect the power transmission path between the transmission and the subsidiary drive wheel, the control device comprising:
    an electronic control unit configured to
    (a) control a transmission torque of the transmission to be less than or equal to a predetermined value when a predetermined condition is satisfied during traveling, and
    (b) control the connection-disconnection mechanism so as to at least partially overlap a time during which the transmission torque of the transmission is controlled to be less than or equal to the predetermined value and a time during which the power transmission path is disconnected by the connection-disconnection mechanism,
    wherein the electronic control unit is configured to change a condition permitting the disconnection of the connection-disconnection mechanism so as to be alleviated while the transmission torque of the transmission is controlled to be less than or equal to the predetermined value, compared to when the transmission torque of the transmission is controlled to be greater than the predetermined value, and
    wherein the condition includes at least one of a friction coefficient on a road surface, a slip amount of a drive wheel, a slip history of the drive wheel, a steering angle, a fluctuation ratio of an engine torque, and a fluctuation ratio of a vehicle speed.

2. The control device according to claim 1, wherein the electronic control unit is configured to disconnect the connection-disconnection mechanism at the same time when the condition is satisfied or the time after a predetermined time elapses from when the condition is satisfied.

3. The control device according to claim 2, wherein the electronic control unit is configured to change the predetermined time based on at least one of an oil temperature of a hydraulic oil of the transmission, an oil temperature of the engine, a coolant temperature of the engine, an outside air temperature, a traveling distance from traveling start, and a traveling time.

4. The control device according to claim 1, wherein the electronic control unit is configured to stop the engine while the transmission torque of the transmission is controlled to be less than or equal to the predetermined value.

5. The control device according to claim 1, further comprising:
    a switching mechanism configured to selectively switch a power transmission to the subsidiary drive wheel on a power transmission path between the transmission and the connection-disconnection mechanism.

6. The control device according to claim 5, wherein the electronic control unit is configured to disconnect the switching mechanism when the power transmission path between the transmission and the connection-disconnection mechanism is disconnected by the connection-disconnect mechanism.

7. The control device according to claim 1, wherein the electronic control unit is configured to control the transmission to perform neutral inertia traveling when the predetermined condition is satisfied during traveling.

8. A control method for a four-wheel drive vehicle, the four-wheel drive vehicle including an engine, a transmission provided on a power transmission path between the engine and a main drive wheel and a subsidiary drive wheel, a connection-disconnection mechanism provided on a power transmission path between the transmission and the subsidiary drive wheel to selectively connect and disconnect the power transmission path between the transmission and the subsidiary drive wheel, and an electronic control unit, the control method comprising:
    (a) controlling, by the electronic control unit, a transmission torque of the transmission to be less than or equal to a predetermined value when a predetermined condition is satisfied during traveling; and
    (b) controlling, by the electronic control unit, the connection-disconnection mechanism so as to at least partially overlap a time during which the transmission torque of the transmission is controlled to be less than or equal to the predetermined value and a time during which the power transmission path is disconnected by the connection-disconnection mechanism,
    wherein the electronic control unit is configured to change a condition permitting the disconnection of the connection-disconnection mechanism so as to be alleviated while the transmission torque of the transmission is controlled to be less than or equal to the predetermined value, compared to when the transmission torque of the transmission is controlled to be greater than the predetermined value, and
    wherein the condition includes at least one of a friction coefficient on a road surface, a slip amount of a drive wheel, a slip history of the drive wheel, a steering angle, a fluctuation ratio of an engine torque, and a fluctuation ratio of a vehicle speed.

9. The control method according to claim 8, wherein the electronic control unit is configured to control the transmission to perform neutral inertia traveling when the predetermined condition is satisfied during traveling.

* * * * *